US011969393B2

(12) United States Patent
Boomgard et al.

(10) Patent No.: US 11,969,393 B2
(45) Date of Patent: Apr. 30, 2024

(54) AFFIXED GROUPS OF PHARMACEUTICAL VIALS INCLUDING FRANGIBLE CONNECTORS

(71) Applicant: Tokitae LLC, Bellevue, WA (US)

(72) Inventors: John Boomgard, Bethesda, MD (US); Fong-Li Chou, Issaquah, WA (US); Philip A. Eckhoff, Kirkland, WA (US); Fridrik Larusson, Seattle, WA (US); Shieng Liu, Bellevue, WA (US); Krishnan Natarajan, Issaquah, WA (US); Nels R. Peterson, Bellevue, WA (US); Lowell L. Wood, Jr., Bellevue, WA (US)

(73) Assignee: Tokitae LLC

( * ) Notice: Subject to any disclaimer, the term of this patent is extended or adjusted under 35 U.S.C. 154(b) by 1010 days.

(21) Appl. No.: 14/306,443

(22) Filed: Jun. 17, 2014

(65) Prior Publication Data

US 2015/0359708 A1 Dec. 17, 2015

(51) Int. Cl.
*A61J 1/16* (2023.01)
*A61J 1/06* (2006.01)
(Continued)

(52) U.S. Cl.
CPC ................ *A61J 1/16* (2013.01); *A61J 1/065* (2013.01); *A61J 1/1406* (2013.01); *A61J 1/1412* (2013.01);
(Continued)

(58) Field of Classification Search
CPC .. A61J 1/2013; A61J 1/065; A61J 1/16; A61J 1/406; A61J 1/1412; A61J 1/1406; B65D 21/0201; B65D 21/0204; B65D 21/0205
(Continued)

(56) References Cited

U.S. PATENT DOCUMENTS 2,099,370 A * 11/1937 Monnier ............... A61J 1/1406 215/247
2,459,301 A 1/1949 Adams
(Continued)

FOREIGN PATENT DOCUMENTS

CN 201969022 U 9/2011
CN 102387968 A 3/2012
(Continued)

OTHER PUBLICATIONS

Supplementary European Search Report; European App. No. EP 14 82 7020; dated Jan. 31, 2017; pp. 1-7.
(Continued)

*Primary Examiner* — Anthony D Stashick
*Assistant Examiner* — Raven Collins
(74) *Attorney, Agent, or Firm* — AEON Law, PLLC; Adam L. K. Philipp; Ki Yong O

(57) ABSTRACT

In some embodiments, an affixed group of pharmaceutical vials with frangible connectors includes: a plurality of pharmaceutical vials arranged as a group of pharmaceutical vials, each of the plurality of pharmaceutical vials shaped and positioned to minimize a total volume of the group of pharmaceutical vials, each of the pharmaceutical vials including at least one external side with a surface configured to reversibly mate with a corresponding external side and a surface of an adjacent pharmaceutical vial; and a plurality of frangible connectors, wherein at least one frangible connector is affixed to the surface of at least two of the plurality of pharmaceutical vials within the group of pharmaceutical vials, and at least one frangible connector is affixed to each of the plurality of pharmaceutical vials.

21 Claims, 10 Drawing Sheets

(51) Int. Cl.
*A61J 1/14* (2023.01)
*B65D 1/09* (2006.01)
*B65D 21/02* (2006.01)

(52) U.S. Cl.
CPC ......... *B65D 1/095* (2013.01); *B65D 21/0201* (2013.01); *A61J 2205/10* (2013.01); *A61J 2205/30* (2013.01); *A61J 2205/60* (2013.01)

(58) Field of Classification Search
USPC .......................................................... 220/23.4
See application file for complete search history.

(56) References Cited

U.S. PATENT DOCUMENTS

| | | | | |
|---|---|---|---|---|
| 2,459,304 | A | 1/1949 | Blank | |
| 2,677,460 | A * | 5/1954 | Johnson | B65D 71/50 206/162 |
| 3,388,791 | A * | 6/1968 | Walsh | B65D 21/0205 206/162 |
| 3,902,992 | A * | 9/1975 | Schuster | B65D 21/0205 206/162 |
| 3,907,505 | A * | 9/1975 | Beall | B01L 3/5085 422/942 |
| 4,089,432 | A | 5/1978 | Crankshaw et al. | |
| 4,098,402 | A * | 7/1978 | Rogg | B65D 21/0204 206/387.1 |
| 4,133,445 | A * | 1/1979 | Mandelbaum | B65D 21/0204 206/504 |
| 4,527,703 | A | 7/1985 | Cummings | |
| 4,793,487 | A * | 12/1988 | Bentsen | B65D 33/001 206/451 |
| 5,009,309 | A | 4/1991 | Hansen | |
| 5,232,108 | A | 8/1993 | Nakamura | |
| 5,242,066 | A | 9/1993 | Kelsey | |
| 5,662,642 | A * | 9/1997 | Isono | A61J 1/2089 604/403 |
| 5,910,138 | A | 6/1999 | Sperko et al. | |
| 6,116,449 | A | 9/2000 | Chiesi et al. | |
| 6,234,333 | B1 | 5/2001 | Federighi et al. | |
| 6,604,561 | B2 | 8/2003 | Py | |
| 6,684,916 | B2 | 2/2004 | Py | |
| 6,733,273 | B1 | 5/2004 | Hansen | |
| 6,846,305 | B2 | 1/2005 | Smith et al. | |
| 7,258,251 | B2 | 8/2007 | Johnson | |
| 7,282,269 | B2 | 10/2007 | Wang et al. | |
| 7,707,807 | B2 | 5/2010 | Py | |
| 8,556,183 | B2 | 10/2013 | Bray | |
| 9,802,196 | B2 * | 10/2017 | Taunk | B01L 3/5453 |
| 10,456,328 | B2 * | 10/2019 | Brandenburger | B65D 1/0238 |
| 2003/0141218 | A1 * | 7/2003 | Stephens | B65D 1/30 206/820 |
| 2005/0234422 | A1 | 10/2005 | Oh et al. | |
| 2005/0258129 | A1 | 11/2005 | Model | |
| 2007/0013521 | A1 | 1/2007 | Lindsay et al. | |
| 2007/0284330 | A1 * | 12/2007 | Finneran | B65D 11/04 215/43 |
| 2007/0289884 | A1 | 12/2007 | Py | |
| 2009/0016936 | A2 | 1/2009 | Balestracci et al. | |
| 2010/0094244 | A1 | 4/2010 | Pech | |
| 2010/0155396 | A1 * | 6/2010 | Warner | B65D 1/0215 220/4.24 |
| 2012/0089088 | A1 | 4/2012 | Foshee et al. | |
| 2012/0104660 | A1 | 5/2012 | Disawal et al. | |
| 2014/0069839 | A1 | 3/2014 | Colin | |
| 2014/0374299 | A1 * | 12/2014 | Tsai | B01L 3/50855 206/438 |

FOREIGN PATENT DOCUMENTS

| | | | |
|---|---|---|---|
| CN | 105517909 | A | 4/2016 |
| DE | 8913828 | U1 | 1/1990 |
| JP | 02-144063 | A | 6/1990 |
| JP | H06509253 | A | 10/1994 |
| JP | H0727583 | A | 1/1995 |
| JP | 2001328685 | A | 11/2001 |
| JP | 2002362652 | A | 12/2002 |
| JP | 2009514754 | A | 4/2009 |
| JP | 2013515513 | A | 5/2013 |
| TW | 201341270 | A | 10/2013 |
| WO | 9005674 | A1 | 5/1990 |
| WO | WO 93/01739 | A1 | 2/1993 |
| WO | WO 99/25629 | | 5/1999 |
| WO | WO2005/009853 | * | 7/2004 |
| WO | 2009128773 | A1 | 10/2009 |
| WO | 2010084393 | A1 | 7/2010 |
| WO | 2011110469 | A1 | 9/2011 |
| WO | WO2011/108385 | A1 | 9/2011 |
| WO | WO 2012/098857 | A1 | 7/2012 |
| WO | WO 2014/070618 | A1 | 5/2014 |

OTHER PUBLICATIONS

PCT International Search Report; International App. No. PCT/US2015/036129; dated Aug. 28, 2015; pp. 1-4.

U.S. Appl. No. 13/945,499, Eckhoff et al.

Akinsanya-Beysolow et al.; "Advisory Committee on Immunization Practices (ACIP) Recommended Immunization Schedule for Persons Aged 0 through 18 Years—United States, 2013"; MMWR; Jan. 28, 2013; pp. 2-8; vol. 62.

Astin, Angela Didomenico; "Finger force capability: measurement and prediction using anthropometric and myoelectric measures"; Virginia Polytechnic Institute and State University M.S. thesis; submitted Dec. 16, 1999; pp. i-x, 1-93; located at http://scholar.lib.vt.edu/theses/available/etd-01132000-12570058/unrestricted/thesis_astin.pdf.

Lee et al.; "Single versus Multi-Dose Vaccine Vials: An Economic Computational Model"; Vaccine; Jul. 19, 2010; pp. 5292-5300; vol. 28, No. 32; Elsevier Ltd.

Thryft, Ann R .; "Self-Healing Plastic Changes Color When Damaged"; Design News; Apr. 30, 2012; pp. 1-2; UBM Canon; located at http://www.designnews.com/author.asp?section_id=1392&doc_id=242838&print=yes.

World Health Organization; "Getting started with vaccine vial monitors; Vaccines and Biologicals, World Health Organization"; Dec. 2002; pp. 1-20 plus cover sheets, end sheet, contents pages, abbreviations page; revision history page and acknowledgments page (29 pages total); World Health Organization; located at www.who.int/vaccines-documents.

World Health Organization; "Getting started with vaccine vial monitors—Questions and answers on field operations; Technical Session on Vaccine Vial Monitors"; Mar. 27, 2002, Geneva; pp. 1-17 (p. 2 left intentionally blank); World Health Organization.

World Health Organization; "Guidelines on the international packaging and shipping of vaccines"; Dec. 2005; pp. i-viii, 1-30, and two cover pages; Ordering code WHO/IVB/05.23; WHO Document Production Services; Geneva, Switzerland.

European Patent Office; Extended European Search Report, Pursuant to Rule 62 EPC; App. No. EP 15809907; dated Jan. 15, 2018; pp. 1-11.

Chinese State Intellectual Property Office, Notification of the Second Office Action, App. No. 201580032972.1 (based on PCT App. No. PCT/US2015/036129); dated Jul. 17, 2019; pp. 1-10 (machine translation provided).

India Intellectual Property Office, Notification of First Examination Report, App. No. 11622/DELNP/2015 (based on PCT App. No. PCT/US2014/046813); dated Dec. 12, 2019; pp. 1-7 (machine translation provided).

Intellectual Property Office of the Ministry of Economic Affairs Taiwan, Notification of the First Office Action, App. No. 10920218960 (based on PCT App. No. PCT/US2015/036129); dated Mar. 9, 2020; pp. 1-8 (machine translation provided).

Garnett, A., "WHO Vaccine Management Handbook Module VMH-E3-01.1: How to Calculate Vaccine Volumes and Cold Chain

(56) References Cited

OTHER PUBLICATIONS

Capacity Requirements," WHO/IVB/17.06, World Health Organization, © Mar. 2017.

* cited by examiner

AFFIXED GROUPS OF PHARMACEUTICAL VIALS INCLUDING FRANGIBLE CONNECTORS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In some embodiments, an affixed group of pharmaceutical vials with frangible connectors includes: a plurality of pharmaceutical vials arranged as a group of pharmaceutical vials, each of the plurality of pharmaceutical vials shaped and positioned to minimize a total volume of the group of pharmaceutical vials, each of the pharmaceutical vials including at least one external side with a surface configured to reversibly mate with a corresponding external side and a surface of an adjacent pharmaceutical vial; and a plurality of frangible connectors, wherein at least one frangible connector is affixed to the surface of at least two of the plurality of pharmaceutical vials within the group of pharmaceutical vials, and at least one frangible connector is affixed to each of the plurality of pharmaceutical vials.

In some embodiments, an affixed group of pharmaceutical vials with frangible connectors includes: a plurality of pharmaceutical vials arranged in a group, each pharmaceutical vial including a first exterior side with a first surface configured to reversibly mate with a surface of an external side of an adjacent pharmaceutical vial, each pharmaceutical vial including a second exterior side with a second surface configured to reversibly mate with a surface of a support; the support including at least one surface configured to reversibly mate with the second surface of each of the plurality of pharmaceutical vials; a first set of frangible connectors positioned between each of the plurality of pharmaceutical vials, wherein at least one frangible connector is affixed to the first surface of each pharmaceutical vial, the at least one frangible connector positioned between each of the pharmaceutical vials and the adjacent pharmaceutical vial and affixing each first surface of a pharmaceutical vial to a first surface of an adjacent pharmaceutical vial; and a second set of frangible connectors positioned between the plurality of pharmaceutical vials arranged in the linear array and the support, wherein at least one frangible connector is affixed to the second surface of each pharmaceutical vial and to the support, the second set of frangible connectors affixing the plurality of pharmaceutical vials arranged in the group to the support.

In some embodiments, an affixed group of pharmaceutical vials with frangible connectors includes: a plurality of pharmaceutical vials arranged as an affixed group of pharmaceutical vials, each pharmaceutical vial including a first exterior side with a first surface configured to reversibly mate with a surface of an external side of an adjacent pharmaceutical vial, each pharmaceutical vial including a second exterior side with a second surface configured to reversibly mate with a surface of a support, each pharmaceutical vial including a top exterior side including an access aperture; the support including at least one surface configured to reversibly mate with the second surface of each of the plurality of pharmaceutical vials, the support including a non-mating surface facing a position adjacent to the affixed group of pharmaceutical vials; a first set of frangible connectors positioned between the plurality of pharmaceutical vials, wherein at least one frangible connector is affixed to the first surface of each pharmaceutical vial, the at least one frangible connector positioned between each of the pharmaceutical vials and the adjacent pharmaceutical vial and affixing each first surface of a pharmaceutical vial to a first surface of an adjacent pharmaceutical vial; a second set of frangible connectors positioned between the plurality of pharmaceutical vials and the support, the second set of frangible connectors affixing the second sides of the plurality of pharmaceutical vials to the support; and a label affixed to the non-mating surface of the support with a label region facing away from the support. In some embodiments, each of the plurality of pharmaceutical vials includes an individual label affixed to the vial. In some embodiments, each of the plurality of pharmaceutical vials includes an individual label that is integral to the vial, for example a label that is embossed or otherwise structurally integral to the vial.

In some embodiments, a method of inventory for pharmaceutical vials in an affixed group of pharmaceutical vials with frangible connectors includes: removing, from a pharmaceutical storage unit including a RFID reader device, a group of pharmaceutical vials affixed to each other with at least one frangible connector, the group of affixed pharmaceutical vials including a label with an affixed RFID device and a plurality of tabs reversibly affixed to a top surface of each of the affixed pharmaceutical vials, a RFID attenuator affixed to each of the plurality of tabs, each RFID attenuator connected to the RFID reader device; breaking at least one frangible connector with physical force to separate a pharmaceutical vial with the reversibly affixed tab and the RFID attenuator from the group of pharmaceutical vials; removing the separated pharmaceutical vial from the affixed group of pharmaceutical vials; and returning the affixed group of pharmaceutical vials to the storage unit.

In some embodiments, a method of inventory for pharmaceutical vials in an affixed group of pharmaceutical vials with frangible connectors includes: sending a RFID signal within a pharmaceutical storage unit from a RFID reader device within the pharmaceutical storage unit; receiving a return RFID signal; comparing the received RFID signal to a set of standard RFID signals to determine if there was an alteration in the received RFID signal corresponding to a change in the RFID device and attached RFID attenuator on an affixed group of pharmaceutical vials.

In some embodiments, a method of inventory for pharmaceutical vials in an affixed group of pharmaceutical vials with frangible connectors includes: removing, from a pharmaceutical storage unit including a pharmaceutical bar code scanner device, a group of pharmaceutical vials affixed to each other with at least one frangible connector, the group of affixed pharmaceutical vials including a label with an affixed pharmaceutical bar code and a plurality of tabs reversibly affixed to a top surface of each of the affixed pharmaceutical vials, a machine-readable identifier affixed to an external surface of each tab; breaking at least one frangible connector with physical force to separate a pharmaceutical vial with the reversibly affixed tab from the group of pharmaceutical vials; removing the separated pharmaceutical vial from the affixed group of pharmaceutical vials; and returning the affixed group of pharmaceutical vials to the pharmaceutical storage unit including the pharmaceutical bar code scanner device. In some methods, the tab is further removable from the detached vial when the vial is accessed via a syringe. See, for example, U.S. Pat. No. 8,556,183 "Systems and Methods Involving transferable Identification Tags," to Bray, which is incorporated by reference herein.

In some embodiments, a method of inventory for pharmaceutical vials in an affixed group of pharmaceutical vials with frangible connectors includes: sending a pharmaceutical bar code scanner signal within a pharmaceutical storage unit from a pharmaceutical bar code scanner device within the pharmaceutical storage unit; receiving a return pharmaceutical bar code signal; comparing the received pharmaceutical bar code signal to a set of pharmaceutical bar codes in memory; identifying a pharmaceutical from comparison of the received signal with the set of pharmaceutical bar codes in memory; sending a machine-readable identifier signal within the pharmaceutical storage unit from the pharmaceutical bar code scanner device within the pharmaceutical storage unit; receiving a return machine-readable identifier signal; comparing the received machine-readable identifier signal to a set of machine-readable identifier signals in memory; and identifying one or more individual pharmaceutical vials present in one or more affixed groups from comparison of the received signal with the set of machine-readable identifier signals in memory.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
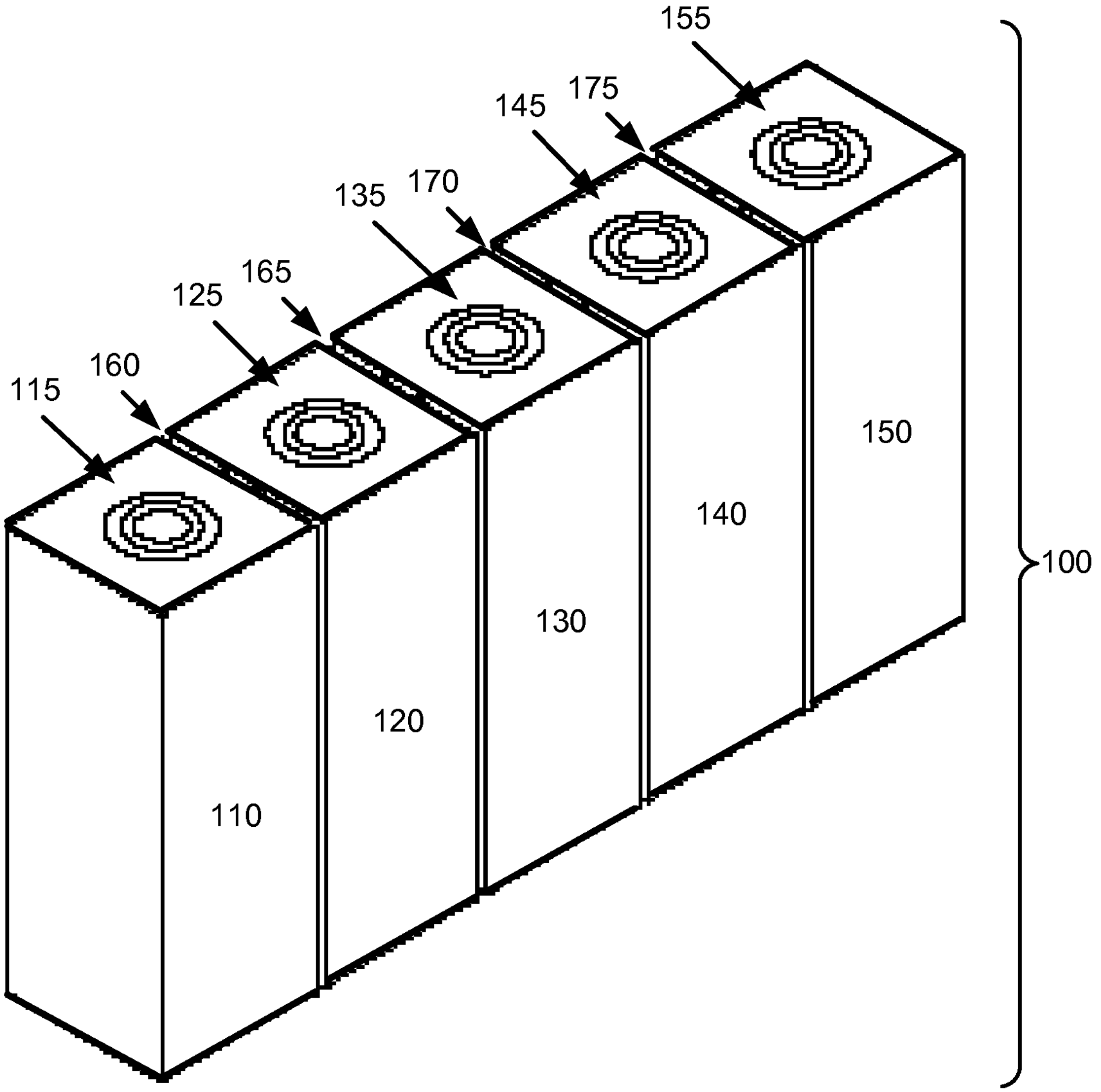
FIG. 1 is a schematic of an affixed group of pharmaceutical vials.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The use of the same symbols in different drawings typically indicates similar or identical items unless context dictates otherwise.

Affixed groups of pharmaceutical vials with frangible connectors are described herein. The affixed groups of pharmaceutical vials are designed to maximize the packing efficiency of pharmaceutical vials in storage and transport. The packing efficiency of pharmaceutical vials is important, for example, with regard to storage and transport of pharmaceutical vials within predetermined temperature ranges in order to maintain the efficacy of the pharmaceuticals stored within the vials. For example, some embodiments include pharmaceutical vials including vaccines, wherein the vaccines must be transported and stored within a temperature range of approximately 0° C. to approximately 10° C. prior to use. For example, some embodiments include pharmaceutical vials including vaccines, wherein the vaccines must be transported and stored within a temperature range of 2° C. to 8° C. prior to use. Efficient packing of pharmaceuticals within the affixed groups of pharmaceutical vials will minimize the space required within the cold chain, reducing cost in both storage and transport.

Each pharmaceutical vial in the affixed group contains a single dose of an injectable pharmaceutical, or a component of an injectable pharmaceutical (e.g. lyophilized material or diluent). In some contexts, therefore, each pharmaceutical vial in an affixed group can be considered an injectable pharmaceutical vial. As used herein, "injectable" refers to injection by a medical professional into the body of a patient directly, generally though use of an injection needle and attached syringe. It is envisioned that each pharmaceutical vial in an affixed group can include a single dose for injection into a patient. For example, some embodiments include affixed groups of individual pharmaceutical vials that are of a size and shape for transport and storage in individual doses of injectable vaccines.

The affixed groups of pharmaceutical vials are designed for easy tracking of multiple doses of pharmaceuticals in a common group, to assist with inventory control and management. Pharmaceutical vials with frangible connectors between the individual, single-dose vials can be removed from an affixed group of pharmaceutical vials by a medical practitioner prior to injection to a patient, and the remainder of the affixed group of pharmaceutical vials can be returned to storage. A visual inspection of the number of vials removed from an affixed group of pharmaceutical vials, and/or the number of vials remaining in the affixed group of pharmaceutical vials in storage, can inform a medical provider of the remaining inventory of single-dose pharmaceutical vials in the affixed group. For example, in some embodiments an affixed group of pharmaceutical vials is positioned as a linear array of 5 vials, multiple groups of which can be easily counted by visual inspection for inventory purposes. For example, in some embodiments an affixed group of pharmaceutical vials is positioned as a linear array of 5 vials of a vaccine, and a medical practitioner can remove individual vials for use as needed, with the remaining unused vials in the group easily visible in storage. Some embodiments also include a cover including one or more reflective transponders, wherein the removal of one or more pharmaceutical vials from an affixed group of pharmaceutical vials changes the characteristics and response of a reflective transponder, which can be included in an inventory tracking system. For example, some embodiments include an affixed RFID tag and attenuators attached to the RFID tag, wherein the attenuators chance the response of the RFID tag depending on the number of vials present in the group.

Affixed groups of pharmaceutical vials with frangible connectors as described herein are configured for storage of pharmaceuticals prior to administration to an individual, such as during shipment and prior to need of the pharmaceutical. Although the text herein is generally stated in the context of human medical situations, an affixed group of pharmaceutical vials can be utilized in non-human (i.e. veterinary) situations. Each of the individual vials within an affixed group of pharmaceutical vials is configured to store an isolated, single dose of a pharmaceutical for administration at a single time. For example, in some embodiments an affixed group of pharmaceutical vials including six vials can store six doses of a vaccine, each dose located in an individual vial of the affixed group of pharmaceutical vials. For example, in some embodiments an affixed group of pharmaceutical vials including four vials can store four doses of a vaccine, each dose located in an individual vial of the affixed group of pharmaceutical vials.

Each vial of an affixed group of pharmaceutical vials is configured to store a single dose of a pharmaceutical. An affixed group of pharmaceutical vials can be used for storage of multiple individual doses of a single pharmaceutical, such as a vaccine, or individual doses of a plurality of pharmaceuticals, such as multiple vaccines, each dose stored in a separate vial within the group. In some embodiments, each vial of an affixed group of pharmaceutical vials includes an approximately equal exterior size and shape. In some embodiments, each pharmaceutical storage compartment of an affixed group of pharmaceutical vials includes an approximately equal interior volume. In some embodiments, an affixed group of pharmaceutical vials includes at least one first pharmaceutical vial with a first interior volume, and at least one second pharmaceutical vial with a second interior volume, wherein the first interior volume and the second interior volume are not equivalent. In some embodiments, an affixed group of pharmaceutical vials includes a plurality of pharmaceutical vials, each vial with a pharmaceutical storage volume of less than approximately 5 milliliters (ml). In some embodiments, an affixed group of pharmaceutical vials includes a plurality of pharmaceutical vials, each vial with a pharmaceutical storage volume of less than approximately 4 milliliters (ml). In some embodiments, an affixed group of pharmaceutical vials includes a plurality of pharmaceutical vials, each vial with a pharmaceutical storage volume of less than approximately 3 milliliters (ml). In some embodiments, an affixed group of pharmaceutical vials includes a plurality of pharmaceutical vials, each vial with a pharmaceutical storage volume of less than approximately 2 milliliters (ml). In some embodiments, an affixed group of pharmaceutical vials includes a plurality of pharmaceutical vials, each vial with a pharmaceutical storage volume of less than approximately 1 milliliter (ml). In some embodiments, an affixed group of pharmaceutical vials includes a plurality of pharmaceutical vials, each vial with a pharmaceutical storage volume of less than approximately 0.5 milliliter (ml).

In some embodiments, an affixed group of pharmaceutical vials with frangible connectors is configured for the transport and storage of a specific number of individual doses of a pharmaceutical intended for use within a limited time period. For example, in some embodiments an affixed group of pharmaceutical vials including six vials is configured to store six doses of a particular injectable vaccine, each dose in one of the six vials, which is equivalent to the estimated number of injection doses of that vaccine required per day on average at a particular health clinic. As each patient in need of vaccine arrives to the clinic, a single vial can be removed from the affixed group of vials by a health care provider and the remainder of the affixed vials returned to storage. In some embodiments, an affixed group of pharmaceutical vials includes a plurality of pharmaceutical vials of approximately equal interior volume. In some embodiments, an affixed group of pharmaceutical vials is configured for the transport and storage of a specific number of individual doses of multiple pharmaceuticals intended for use for a single patient within a limited time period, such as a single medical clinic visit. For example, in some embodiments an affixed group of pharmaceutical vials includes the vaccines suggested to be administered to a child of a particular age at a well-child visit to a medical clinic. For example, in some embodiments an affixed group of pharmaceutical vials including four compartments affixed with frangible connectors can store four doses of four different vaccines which are generally administered to an individual during a single medical visit. For example, in some embodiments an affixed group of pharmaceutical vials including six vials is configured for the storage and transport of a single dose of each of the HepB, RV, DTaP, HiB, PCV, and IPV vaccines, one in each of the vials, for administration to a child according to the routine vaccine schedule suggested for 2 month olds. For example, in some embodiments an affixed group of pharmaceutical vials including four vials is configured for the storage and transport of a single dose of each of the DTaP, IPV, MMR and VAR vaccines, one in each vial, for administration to a child according to the routine vaccine schedule suggested for 4-6 year olds. See "Advisory Committee on Immunization Practices (ACIP) Recommended Immunization Schedule for Persons Aged 0 through 18 years—United States, 2013" ACIP Childhood/Adolescent Work Group, *MMWR* 62: 1-8 (2013), which is incorporated herein by reference. For example, in some embodiments an affixed group of pharmaceutical vials with frangible connectors can be used to store multiple doses of immunoglobulin therapy that can be administered in series to a patient as directed by a medical professional. Several types of immunoglobulin therapy are available that are generally administered serially, in dose volumes relative to the body mass of a patient. Aliquot volumes of an immunoglobulin therapy can be stored in individual vials of an affixed group of pharmaceutical vials with frangible connectors for administration to patients, in a form to minimize waste of the immunoglobulin therapy as well as to minimize the potential of contamination of the immunoglobulin therapy in the vials. For example, in some embodiments an affixed group of pharmaceutical vials can be used to store multiple doses of injection-administered anti-viral therapy. For example, in some embodiments an affixed group of pharmaceutical vials can be used to store multiple doses of injection-administered antibiotic therapy. For example, in some embodiments an affixed group of pharmaceutical vials can be used to store doses of biologicals that include therapeutic proteins. For example, in some embodiments an affixed group of pharmaceutical vials can be used to store doses of biologicals that include antibodies, such as mono-clonal or poly-clonal antibodies. For example, in some embodiments an affixed group of pharmaceutical vials can be used to store multiple doses of an injection-administered therapy generally administered to a single patient in series, so that one affixed group of pharmaceutical vials can include a standard series of injectable doses for a single individual patient to be administered in temporal series under the guidance of a medical professional. For example, in some embodiments an affixed group of pharmaceutical vials can be used to store doses of an injection-administered therapy that has multiple components that are administered separately, for example different antibiotics and/or antivirals that are administered to a single patient in need thereof.

Pharmaceuticals suitable for storage in embodiments of an affixed group of pharmaceutical vials with frangible connectors are pharmaceuticals configured for injection into an individual via a syringe. In some embodiments, an affixed group of pharmaceutical vials is configured for storage and transport of pharmaceuticals within the cold chain. For example, an affixed group of pharmaceutical vials may be configured to store pharmaceuticals in a temperature range between 2 degrees Centigrade and 8 degrees Centigrade. For example, an affixed group of pharmaceutical vials may be configured to store pharmaceuticals in a temperature range between 2 degrees Centigrade and 30 degrees Centigrade. See World Health Organization, "Guidelines on the International Packaging and Shipping of Vaccines" order code WHO/IVB/05.23, printed December 2005, which is incorporated herein by reference. An affixed group of pharmaceutical vials can store and transport pharmaceuticals intended for injection into humans. An affixed group of pharmaceutical vials can store and transport pharmaceuticals intended for veterinary injections. Pharmaceuticals can be stored and transported in a liquid form in an affixed group of pharmaceutical vials prior to injection. Pharmaceuticals can be lyophilized for transport and storage prior to use and then reconstituted into a liquid form within a vial of the affixed group of pharmaceutical vials before administration. In some embodiments, an affixed group of pharmaceutical vials is intended for storage of a lyophilized pharmaceutical, wherein prior to use a medical professional adds sterile diluent, rehydrates the lyophilized material (e.g. by shaking the vial) and subsequently accesses the vial with a syringe needle for injection. In some embodiments, an affixed group of pharmaceutical vials includes an even number of pharmaceutical vials oriented as linear pairs (e.g. 2×3, 2×4, etc.) wherein one of each of the paired vials includes a lyophilized pharmaceutical and the other paired vial includes the appropriate diluent.

In some embodiments, an affixed group of pharmaceutical vials with frangible connectors is configured for storage and transport of vaccines. For example, in some embodiments an affixed group of pharmaceutical vials can hold multiple doses of a vaccine, each dose stored in an individual vial prior to administration of the vaccine. In some embodiments, an affixed group of pharmaceutical vials with frangible connectors is an affixed group of vaccine vials. In some embodiments, an affixed group of vaccine vials is configured to include a plurality of doses of different vaccines, each dose stored separately in a distinct vial. In some embodiments, an affixed group of vaccine vials is configured to include a plurality of doses of the same vaccine, each dose stored separately in a distinct vial. The affixed groups of pharmaceutical vials can include labels, packaging, and temperature monitors, as appropriate to the contents of the vial. See World Health Organization, "Guidelines on the International Packaging and Shipping of Vaccines" order code WHO/IVB/05.23, printed December 2005, which is incorporated herein by reference.

Isolation of the individual doses of a pharmaceutical into distinct vials reduces the potential for cross-contamination between different vials of the affixed group of pharmaceutical vials. In order to minimize the potential for cross-contamination, each vial within an affixed group of pharmaceutical vials is intended for single-use storage and access. During use, a vial is removed from the affixed group of pharmaceutical vials with frangible connectors before a syringe is inserted into a distinct vial to draw out the single dose of a pharmaceutical stored that that vial, and after the dose is removed the vial is not re-accessed to obtain more of the pharmaceutical. An affixed group of pharmaceutical vials with frangible connectors is not configured for re-use or refilling of the separate vials with additional pharmaceutical. Use of an affixed group of pharmaceutical vials can reduce pharmaceutical waste, such as open-vial vaccine wastage from multi-dose vials. See Lee et al., "Single versus Multi-Dose Vaccine Vials: An Economic Computational Model," *Vaccine* 38 (32): 5292-5300 (2010), which is incorporated by reference herein.

Depending on the embodiment, an affixed group of pharmaceutical vials with frangible connectors provides at least a two-fold volume reduction over individual single dose pharmaceutical vials while continuing to provide separate vials for individual doses and in order to minimize the potential for cross-contamination. An affixed group of pharmaceutical vials is energy efficient and space efficient during storage and transport, providing a shipping and storage advantage over individual single-use pharmaceutical vials by reducing weight and bulk of packaging. In some embodiments, an affixed group of pharmaceutical vials con provide a manufacturing advantage over individual vials, by providing a reduced marginal cost of production per dose of injectable pharmaceutical. An affixed group of pharmaceutical vials requires less packaging than individual vials, reducing cost in production as well as the eventual disposal of the vials. Use of affixed groups of pharmaceutical vials with frangible connectors can reduce the number of vaccine vial monitors (VVMs) or other temperature monitors commonly used during shipment of pharmaceuticals, such as vaccines, within the cold chain. See World Health Organization, "Guidelines on the International Packaging and Shipping of Vaccines" order code WHO/IVB/05.23, printed December 2005, which is incorporated herein by reference. The affixed groups of pharmaceutical vials described herein can be utilized to reduce or eliminate use of preservatives in vaccines, relative to the required preservative content in multi-dose vials.

An affixed group of pharmaceutical vials with frangible connectors can be fabricated from materials suitable for liquid pharmaceutical storage, depending on the intended pharmaceutical use for a specific vial embodiment. For example, affixed groups of pharmaceutical vials can be fabricated from glass. For example, affixed groups of pharmaceutical vials can be fabricated from plastic, such as polystyrene. In some embodiments, affixed groups of pharmaceutical vials with frangible connectors can be fabricated in blow-molded plastic processes. In some embodiments, affixed groups of pharmaceutical vials with frangible connectors can be fabricated in blow-fill-seal processes. For example, in some embodiments it can be cost-effective to manufacture affixed groups of pharmaceutical vials in aseptic blow/fill/seal systems. In some embodiments, affixed groups of pharmaceutical vials can be fabricated in a process to minimize contamination during assembly. See, for example, U.S. Pat. No. 7,707,807, "Apparatus for Molding and Assembling Containers with Stoppers and Filling Same," to Py, which is incorporated herein by reference. In some embodiments, affixed groups of pharmaceutical vials with frangible connectors can be fabricated with a formed identification region on either some or all of the affixed vials, and/or on a support. See, for example, US Patent Application Publication No. 2012/0104660, "Injection Molding of Micron and Nano Scale Features for Pharmaceutical Brand Protection," to Disawal et al., which is herein incorporated by reference. In some embodiments, affixed groups of pharmaceutical vials are fabricated from translucent or transparent materials. Affixed groups of pharmaceutical vials fabricated from translucent or transparent materials can, for example, provide visibility for a user, such as during removal of a stored pharmaceutical by a syringe. In some embodiments, affixed groups of pharmaceutical vials with frangible connectors include a plurality of pharmaceutical vials, wherein each of the pharmaceutical vials is positioned adjacent to an exterior of the group. In some embodiments, affixed groups of pharmaceutical vials can be fabricated from medically acceptable materials, such as polypropylene or other polyolefins. In some embodiments, affixed groups of pharmaceutical vials with frangible connectors can be fabricated from solid materials that fix the size and shape of the individual vials individually as well as relative to each other.

In some embodiments, an affixed group of pharmaceutical vials with frangible connectors is fabricated with an aperture in the top surface of each of the individual pharmaceutical vials within the group, the aperture connecting to an internal pharmaceutical storage region within each of the individual pharmaceutical vials. In some embodiments, an affixed group of pharmaceutical vials is fabricated with an aperture in the top surface of each of the individual pharmaceutical vials and a stopper with a surface mated to the surface of the aperture. See, for example, U.S. Pat. No. 6,733,273 "Device for Producing Extrusion Blow-Molded Containers with at least Two Chambers," to Hansen, and U.S. Pat. No. 5,009,309 "Double Chamber Receptacle," to Hansen, which are each incorporated by reference herein.

In some embodiments, an affixed group of pharmaceutical vials is fabricated from a pliable material, so that the entirety of each vial is formed from the material. For example, in some embodiments, an affixed group of pharmaceutical vials is fabricated using a blow-fill-seal process. Each vial can include a piercing region configured for the traverse insertion of an injection needle by a user to access a pharmaceutical liquid in a storage region within each vial. In some embodiments, an affixed group of pharmaceutical vials is fabricated from a material suitable for use with an injection needle that is a non-coring needle.

In some embodiments, an affixed group of pharmaceutical vials is fabricated from a rigid material, such as a medically-appropriate glass or plastic material. In an embodiment fabricated from a rigid material, the internal volume of the entire affixed group of pharmaceutical vials remains fixed prior to use, during use, and after use. In embodiments wherein an affixed group of pharmaceutical vials is fabricated from a rigid material, the internal volume of each of the plurality of pharmaceutical vials remains constant and does not change when a pharmaceutical vial internally holds a dose of a pharmaceutical or after the pharmaceutical dose has been removed from the pharmaceutical vial.

In some embodiments, an affixed group of pharmaceutical vials is fabricated from a flexible material, such as a medically-appropriate plastic material. In an embodiment fabricated from a flexible material, the internal volume of the entire affixed group of pharmaceutical vials can change relative to the amount of material, such as gas and/or liquid, stored in each of the plurality of pharmaceutical vials. For example, each of the plurality of pharmaceutical vials can be configured to deform after removal of a dose of a pharmaceutical stored in the vial, based on a reduced internal pressure of each of the vials after removal of the stored pharmaceutical dose from the interior of the vial. For example, each of the plurality of pharmaceutical vials can be configured to collapse after removal of a dose of a pharmaceutical stored in the vial. Deflation of a pharmaceutical vial after removal of a stored pharmaceutical dose can, for example, provide a visual indicator to a user that the dose has been removed. Deflation of a pharmaceutical vial after removal of a stored pharmaceutical dose can, for example, reduce the space required to dispose of the used vial, which may be a significant consideration in some circumstances, for example when a pharmaceutical vial is considered to be a biohazard after removal of the pharmaceutical.

Some embodiments include a plurality of pharmaceutical vials arranged as an affixed group of pharmaceutical vials fabricated with a blow-molded method, such as a blow-fill-seal method. A blow-fill-seal mold can include a vial mold and a seal mold, wherein a variety of seal molds with different geometries can be interchanged to provide different seal geometries in the final product. In some embodiments, separate injection molded caps can be welded to one or more of the affixed group of pharmaceutical vials. For example, in some embodiments a cap including at least one port is sealed onto a vial at a single aperture after the vial is filled with a pharmaceutical product. In some embodiments, separate injection molded caps can be welded to a single aperture in one or more of the affixed group of pharmaceutical vials to create a multi-entry format, such as for insertion of a diluent into a lyophilized pharmaceutical prior to removal of the reconstituted pharmaceutical with an injection needle. In some embodiments, a plurality of pharmaceutical vials arranged as an affixed group of pharmaceutical vials are fabricated to include special diameter ports for specialized situations.

In some embodiments, an affixed group of pharmaceutical vials includes: a plurality of pharmaceutical vials arranged as a group of pharmaceutical vials, each of the plurality of pharmaceutical vials shaped and positioned to minimize a total volume of the group of pharmaceutical vials, each of the pharmaceutical vials including at least one external side with a surface configured to reversibly mate with a corresponding external side and a surface of an adjacent pharmaceutical vial; and a plurality of frangible connectors, wherein at least one frangible connector is affixed between each of the plurality of pharmaceutical vials within the group of pharmaceutical vials.

With reference now to FIG. 1, shown is an example of an affixed group of pharmaceutical vials with frangible connectors. The embodiment of an affixed group of pharmaceutical vials 100 shown in FIG. 1 includes five individual pharmaceutical vials 110, 120, 130, 140, 150 positioned as a linear array. Each of the individual pharmaceutical vials 110, 120, 130, 140, 150 within the plurality of pharmaceutical vials is shaped and positioned to minimize a total volume of the group of pharmaceutical vials. Each of the individual pharmaceutical vials 110, 120, 130, 140, 150 is substantially cuboid, and the linear array is positioned so that the total volume of the affixed group of pharmaceutical vials is minimized. Each of the individual pharmaceutical vials 110, 120, 130, 140, 150 includes a top surface including an aperture with an attached stopper 115, 125, 135, 145, 155. Each of the individual pharmaceutical vials 110, 120, 130, 140, 150 within the plurality of pharmaceutical vials includes at least one external side with a surface configured to reversibly mate with a corresponding external side and a surface of an adjacent pharmaceutical vial. There is a small gap 160, 165, 170, 175 positioned between each of the five individual pharmaceutical vials 110, 120, 130, 140, 150 and its adjacent vial(s) in the linear array. For example, in the embodiment shown in FIG. 1, each of the pharmaceutical vials arranged as a group includes a substantially flat exterior wall of the vial that is positioned facing a corresponding substantially flat exterior wall of an adjacent vial, with minimal space in the gap 160, 165, 170, 175 between the vials. The affixed group of pharmaceutical vials includes a plurality of frangible connectors, wherein at least one frangible connector is affixed between each of the plurality of pharmaceutical vials 110, 120, 130, 140, 150 within the group of pharmaceutical vials 100. At least one frangible connector is positioned within each gap 160, 165, 170, 175, with ends affixed to each of the adjacent pharmaceutical vials 110, 120, 130, 140, 150.

In some embodiments, the plurality of pharmaceutical vials within an affixed group of pharmaceutical vials with frangible connectors is positioned as a linear array of pharmaceutical vials. In some embodiments, the plurality of pharmaceutical vials within an affixed group of pharmaceutical vials includes at least three pharmaceutical vials positioned as a linear array. For example, a plurality of pharmaceutical vials within an affixed group of pharmaceutical vials can include three vials, or a number greater than three vials. In some embodiments, the plurality of pharmaceutical vials within an affixed group of pharmaceutical vials includes at least four pharmaceutical vials positioned as a linear array. For example, a plurality of pharmaceutical vials within an affixed group of pharmaceutical vials can include four vials, or a number greater than four vials. In some embodiments, the plurality of pharmaceutical vials within an affixed group of pharmaceutical vials includes at least five pharmaceutical vials positioned as a linear array. For example, a plurality of pharmaceutical vials within an affixed group of pharmaceutical vials can include five vials, or a number greater than five vials. In some embodiments, the plurality of pharmaceutical vials within an affixed group of pharmaceutical vials is positioned as a non-linear array. In some embodiments, the plurality of pharmaceutical vials within an affixed group of pharmaceutical vials includes an even number of pharmaceutical vials positioned in two even and parallel lines. In some embodiments, the plurality of pharmaceutical vials within an affixed group of pharmaceutical vials are positioned in a rectangular or circular orientation.

Generally, an affixed group of pharmaceutical vials with frangible connectors is of a size and shape for easy handling by a user, so the total volume of an affixed group of pharmaceutical vials should be sufficient for the total volume to be easily handled by an individual person. For example, in some embodiments, an affixed group of pharmaceutical vials with frangible connectors includes a plurality of cuboid pharmaceutical vials, wherein each of the individual pharmaceutical vials has external dimensions of approximately 10 mm×10 mm×25 mm. For example, in some embodiments, an affixed group of pharmaceutical vials with frangible connectors includes a plurality of cuboid pharmaceutical vials, each with external dimensions greater than approximately 10 mm×10 mm×25 mm, but still small enough to fit in a human hand. Some embodiments include an affixed group of pharmaceutical vials with frangible connectors with a plurality of cuboid pharmaceutical vials wherein each of the individual pharmaceutical vials has external dimensions of approximately 10 mm×10 mm×25 mm, walls approximately 1 mm in thickness, and an internal storage region with a volume of approximately 0.85 $cm^3$. Some embodiments include an affixed group of pharmaceutical vials with frangible connectors with walls of approximately 0.5 mm thickness at their thinnest location on the vial. Some embodiments include an affixed group of five cuboid pharmaceutical vials, wherein the external dimensions of the affixed group is approximately 50 mm wide by 25 mm tall, by 10 mm thick. Such an embodiment could be packaged, for example, in a box of five affixed groups each including five cuboid pharmaceutical vials, with external dimensions of the box approximately 50 mm square by 27 mm tall. Some embodiments include an affixed group of five cuboid pharmaceutical vials attached to a support, wherein the external dimensions of the affixed group including the support is approximately 50 mm wide by 25 mm tall, by 12 mm thick. Such an embodiment could be packaged, for example, in a box of five affixed groups each including five cuboid pharmaceutical vials affixed to a support, with external dimensions of the box approximately 63 mm wide, 52 mm long and 27 mm tall.

In the embodiments described herein, each pharmaceutical vial within an affixed group of pharmaceutical vials is configured with an internal pharmaceutical storage region and a single access aperture to the internal pharmaceutical storage region on the top face of the pharmaceutical vial. The access aperture can be configured for insertion of an injection needle attached to a syringe for use by a medical professional to draw out the pharmaceutical prior to administration by injection to a patient. The access aperture can be configured for insertion of an injection needle attached to a syringe for use by a medical professional to reconstitute lyophilized pharmaceutical within the vial prior to injection to at patient. Some embodiments include a pharmaceutical stopper affixed to the access aperture, the pharmaceutical stopper configured to permit extraction of a liquid pharmaceutical in a storage region within an affixed pharmaceutical vial.

Some embodiments include an affixed group of pharmaceutical vials, including a plurality of pharmaceutical vials arranged as a first linear array and a second linear array, the first and second linear array positioned in parallel to each other, each pharmaceutical vial including a first exterior side with a surface configured to reversibly mate with a surface of an external side of a first adjacent pharmaceutical vial, each pharmaceutical vial including a second exterior side with a surface configured to reversibly mate with a surface of an external side of a second pharmaceutical vial. For example, an affixed group of pharmaceutical vials can include two linear arrays of pharmaceutical vials of equivalent size and shape, arranged as two lines, with frangible connectors affixing each vial to its adjacent vials in the group. In some embodiments, each of the plurality of pharmaceutical vials in an affixed group of pharmaceutical vials is cuboid. A cuboid shape can, for example, provide parallel surfaces on a first pharmaceutical vial and a second, adjacent vial, the parallel surfaces attaching at significantly right angles to the opposing ends of a frangible connector positioned between the first pharmaceutical vial and the second pharmaceutical vial.

Some embodiments include an affixed group of pharmaceutical vials, including a plurality of pharmaceutical vials of a similar size and shape. Some embodiments include an affixed group of pharmaceutical vials, including a plurality of pharmaceutical vials that are each single-use vials. Some embodiments include an affixed group of pharmaceutical vials, wherein each of the plurality of pharmaceutical vials have approximately the same external dimensions. For example, some embodiments include an affixed group of five cuboid pharmaceutical vials of approximate exterior size of 10 mm by 10 mm by 25 mm each. For example, some embodiments include an affixed group of pharmaceutical vials, including a plurality of pharmaceutical vials each of a size approximately 10 mm by 10 mm by 25 mm. For example, some embodiments include an affixed group of five cuboid pharmaceutical vials of approximate exterior size of approximately 49 mm by 51 mm by 27 mm each.

In some embodiments, there is an affixed group of pharmaceutical vials wherein each of the pharmaceutical vials within the affixed group includes at least one external side with a surface configured to reversibly mate with a corresponding external side and a surface of an adjacent pharmaceutical vial, and wherein the at least one external side of each of the plurality of pharmaceutical vials are substantially rectangular. For example, a cuboid pharmaceutical vial would inherently include sides that are substantially rectangular. In some embodiments, there is an affixed group of pharmaceutical vials wherein each of the pharmaceutical vials within the affixed group includes at least one external side with a substantially planar surface. For example, some embodiments include an affixed group of pharmaceutical vials positioned as a linear array, wherein each pharmaceutical vial includes substantially rectangular side surfaces facing the adjacent vial, with frangible connectors affixing the substantially rectangular side surfaces of each vial to an adjoining vial. In some embodiments, there is an affixed group of pharmaceutical vials wherein each of the pharmaceutical vials within the affixed group includes at least one external side with a surface configured to reversibly mate with a corresponding external side and a surface of an adjacent pharmaceutical vial, and wherein the at least one external side of each of the plurality of pharmaceutical vials are substantially planar. For example, some embodiments include an affixed group of pharmaceutical vials positioned as a linear array, wherein each pharmaceutical vial includes substantially planar side surfaces facing the adjacent vial, with frangible connectors affixing the substantially planar side surfaces of each vial to an adjoining vial. Some embodiments include an affixed group of pharmaceutical vials positioned as a linear array, wherein each pharmaceutical vial includes substantially rectangular and substantially planar side surfaces.

In some embodiments, there is an affixed group of pharmaceutical vials wherein the plurality of pharmaceutical vials are positioned for maximum density of the pharmaceutical vials. For example, an affixed group of pharmaceutical vials wherein each of the pharmaceutical vials within the affixed group is a cuboid structure would be positioned for maximum density of the pharmaceutical vials of that shape if they were positioned with their planar sides in parallel with each other. For example, an affixed group of pharmaceutical vials wherein each of the pharmaceutical vials within the affixed group is a cuboid structure would not be positioned for maximum density of the pharmaceutical vials of that shape if they were positioned with their planar sides at angles, such as right angles, with each other. In some embodiments, there is an affixed group of pharmaceutical vials wherein the plurality of pharmaceutical vials are positioned for maximum packing efficiency of material within the pharmaceutical vials. For example, the pharmaceutical vials can be of an appropriate size and shape to achieve a minimal space between adjacent vials, and also can be of a size and shape to minimize headspace for the particular single doses of a pharmaceutical.

Figure 2:
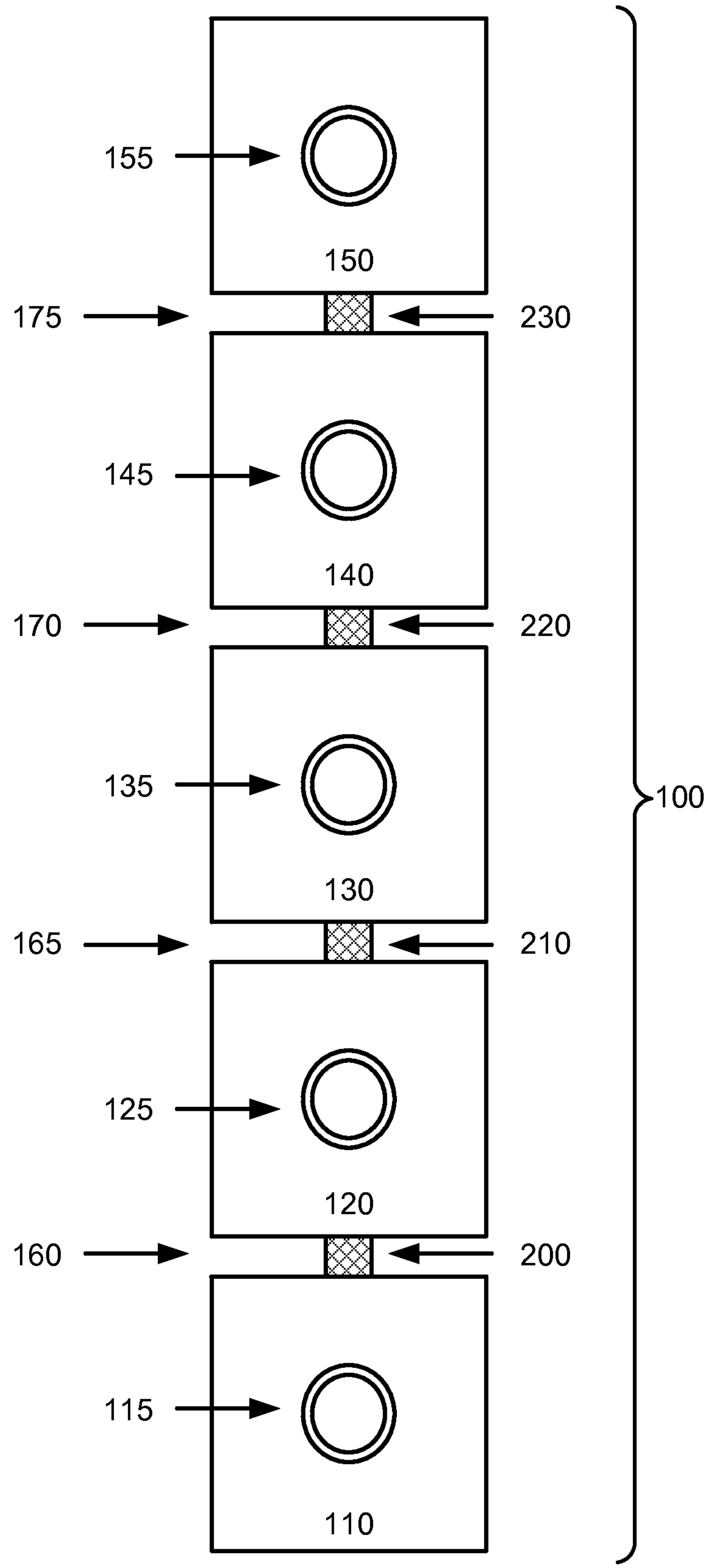
FIG. 2 is a schematic of an affixed group of pharmaceutical vials.

FIG. 2 depicts an example of an affixed group of pharmaceutical vials, shown from a top-down viewpoint. The embodiment of an affixed group of pharmaceutical vials 100 shown in FIG. 2 includes five individual pharmaceutical vials 110, 120, 130, 140, 150 positioned as a linear array. Each of the individual pharmaceutical vials 110, 120, 130, 140, 150 is substantially cuboid, and the linear array is positioned so that a side including a planar surface of each pharmaceutical vial is in parallel with a side including a planar surface of the adjacent pharmaceutical vial. Each of the individual pharmaceutical vials 110, 120, 130, 140, 150 includes a top surface including an aperture 115, 125, 135, 145, 155. There is a small gap 160, 165, 170, 175 positioned between each of the five individual pharmaceutical vials 110, 120, 130, 140, 150 and its adjacent vial(s) in the linear array.

A frangible connector 200, 210, 220, 230, is positioned within the gap 160, 165, 170, 175 positioned between each of the five individual pharmaceutical vials. The frangible connector 200, 210, 220, 230 positioned within the gap 160, 165, 170, 175 between each of the individual pharmaceutical vials 110, 120, 130, 140, 150 has a first end affixed to a surface of one of the pharmaceutical vials and a second end affixed to an opposing surface of an adjacent pharmaceutical vial. For example, in the embodiment shown in FIG. 2, the affixed group of pharmaceutical vials 100 is positioned as a linear array and a first pharmaceutical vial 110 has a planar surface positioned to be in parallel with the adjacent planar surface of pharmaceutical vial 120, with a gap 160 between the two adjacent vials. A frangible connector 200 has a first end affixed to the planar surface of pharmaceutical vial 110 and a second end affixed to the opposing planar surface of pharmaceutical vial 120. The second pharmaceutical vial 120 in the linear array includes a second planar surface opposing the first planar surface affixed to the first pharmaceutical vial 110. The second planar surface of pharmaceutical vial 120 is positioned in parallel with a planar surface of the third pharmaceutical vial, 130. A gap 165 exists between the two adjacent vials 120, 130. A frangible connector 210 has a first end affixed to the planar surface of pharmaceutical vial 120 and a second end affixed to the opposing planar surface of pharmaceutical vial 130. This pattern of pharmaceutical vials and frangible connectors continues through the linear array of the affixed group of pharmaceutical vials 100.

An affixed group of pharmaceutical vials, as described herein, includes a plurality of frangible connectors, wherein at least one frangible connector is affixed between each of the plurality of pharmaceutical vials within the group of pharmaceutical vials. In some embodiments, the group of pharmaceutical vials includes the plurality of frangible connectors affixed to an adjacent surface of another pharmaceutical vial within the group of pharmaceutical vials. In some embodiments, each of the frangible connectors includes a substantially linear projection from the face of the pharmaceutical vial, the projection including a first end affixed to the face of the pharmaceutical vial and a second end affixed to the face of an adjacent pharmaceutical vial within the group of pharmaceutical vials.

As used herein, "frangible connectors" refers to connectors between pharmaceutical vials, the frangible connectors easily broken or breakable by an end user of the affixed group of pharmaceutical vials. For example, in some embodiments a frangible connector is of a size, shape, composition and position to be intact during expected transport and breakable by a human hand. For example, a frangible connector may be shaped and positioned so as to be relatively stable under most expected physical forces against an affixed group of pharmaceutical vials during manufacture, transport and storage of the affixed group of pharmaceutical vials, but breakable by the expected force of a human finger or hand against a particular vial within the affixed group. For more information regarding the expected forces generated by a human hand, see "Finger Force Capability: Measurement and Prediction Using Anthropmetric and Myoelectric Measures," Angela Astin, Virginia Polytechnic Institute M.S. thesis, submitted Dec. 16, 1999, which is herein incorporated by reference. In some embodiments, a frangible connector can be configured to be easily broken by a human finger or hand putting pressure at a particular angle against a particular vial within the affixed group. For example, a frangible connector can be of a size, shape and material to be broken by the pressure generally expected to be possible from a human thumb. In some embodiments, frangible connectors are positioned so that when a user, such as a medical professional, grasps the affixed group of pharmaceutical vials, at least one frangible connector is positioned to be easily broken by the applied force of a finger from the grasping hand, in the direction that the finger would be expected to have the ability to apply that force.

In some embodiments, a frangible connector includes a substantially linear projection between an exterior surface of a vaccine vial within a group and an exterior surface of an adjacent vial. For example, some embodiments include frangible connectors that are substantially linear projections of approximately 2 mm by 2 mm by 3 mm. For example, some embodiments include frangible connectors that are substantially linear projections of approximately 5 mm by 5 mm by 5 mm. For example, some embodiments include frangible connectors that are substantially linear projections that are less than approximately 5 mm on every side of the frangible connector. For example, some embodiments include frangible connectors that are substantially linear projections that are less than approximately 10 mm on every side of the frangible connector. In some embodiments, a frangible connector includes a planar sheet between an exterior surface of a vaccine vial within a group and an exterior surface of an adjacent vial. In some embodiments, a frangible connector includes a series of projections between an exterior surface of a vaccine vial within a group and an exterior surface of an adjacent vial. For example, some embodiments include one frangible connector affixed to the surface of each vial and positioned between adjacent vials. For example, some embodiments include two frangible connectors affixed to the surface of each vial and positioned between adjacent vials. For example, some embodiments include three frangible connectors affixed to the surface of each vial and positioned between adjacent vials. For example, some embodiments include more than one frangible connector affixed to the surface of each vial and positioned between adjacent vials. In some embodiments, the frangible connectors for an affixed group of pharmaceutical vials are fabricated from the same material as the pharmaceutical vials. For example, in some embodiments an affixed group of pharmaceutical vials is fabricated from glass, and the frangible connectors are fabricated from the same glass material, or a compatible glass. For example, in some embodiments an affixed group of pharmaceutical vials is fabricated from plastic, and the frangible connectors are fabricated from the same plastic material, or a compatible plastic. In some embodiments, an affixed group of pharmaceutical vials, including the frangible connectors, is fabricated together as a unit, for example by use of a mold process. In some embodiments, an affixed group of pharmaceutical vials, including the frangible connectors, is initially fabricated as individual pieces and then connected at a subsequent step in the manufacturing process.

Figure 3:
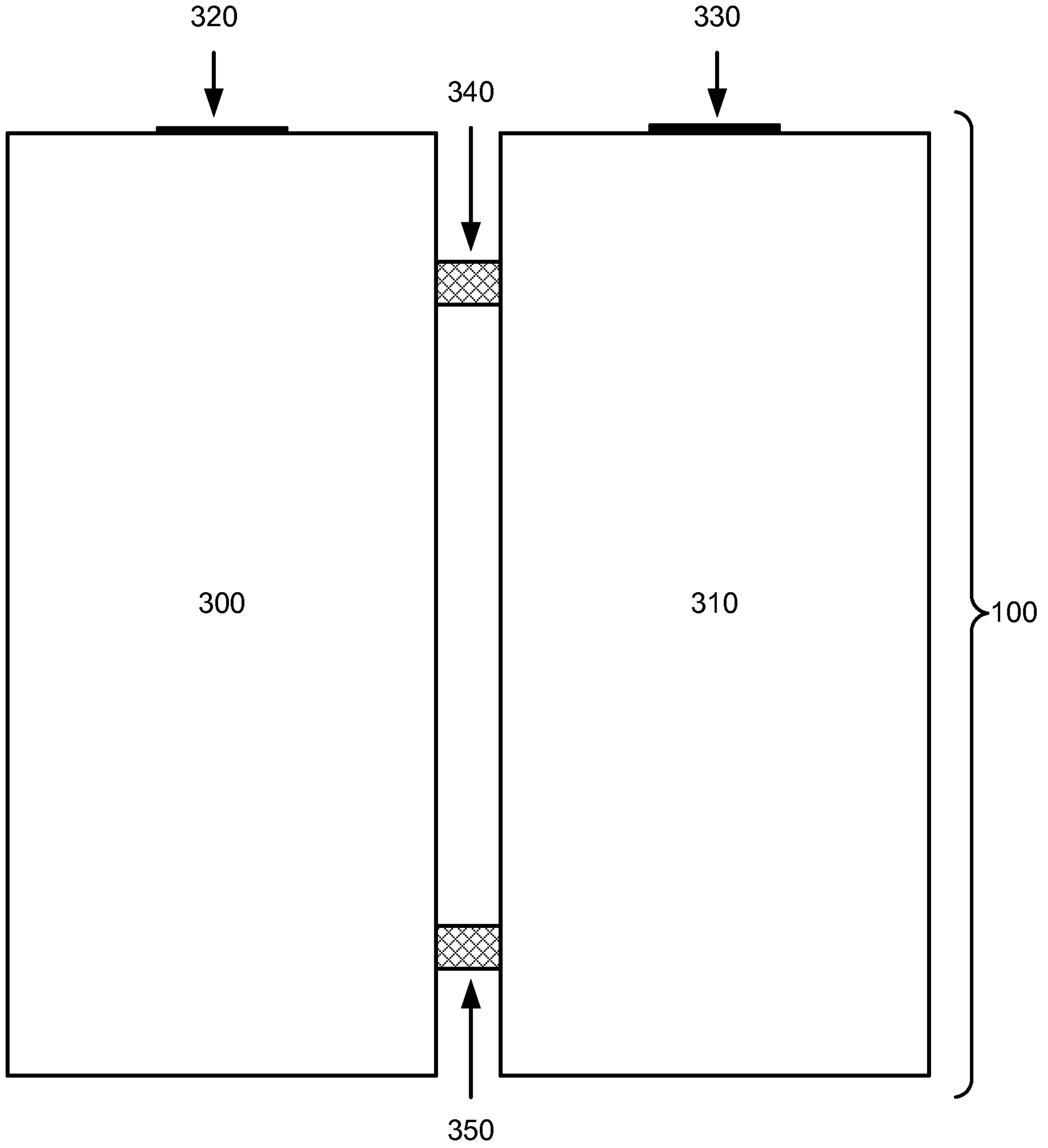
FIG. 3 is a schematic of an affixed group of pharmaceutical vials.

FIG. 3 depicts aspects of an embodiment of an affixed group of pharmaceutical vials 100. FIG. 3 depicts two affixed pharmaceutical vials from a group in a side viewpoint. For example, two vials positioned similarly to those depicted in FIG. 3 can be at the ends of two linear arrays of pharmaceutical vials in an affixed group, although the additional vials are not visible from the illustrated viewpoint. The vials are each cuboid, with a rectangular side facing the viewpoint shown. Each of the vials 300, 310 has a top surface including an aperture, with a seal 320, 330 positioned in the aperture, the seal including edges configured to mate with the sides of the aperture. Two pharmaceutical vials are shown in the affixed group of pharmaceutical vials 100 in FIG. 3, although in some embodiments more than two pharmaceutical vials are included in an affixed group of pharmaceutical vials. For example, some embodiments include two linear rows of pharmaceutical vials affixed and arranged as two parallel lines. In the embodiment shown, a first pharmaceutical vial 300 is positioned with a side planar surface substantially parallel to a side planar surface of an adjacent, second pharmaceutical vial, 310, and a gap between the side planar surfaces of the vials.

Some embodiments include a single frangible connector within the gap affixing a pharmaceutical vial to an adjacent pharmaceutical vial. Some embodiments include two or more frangible connectors within one or more gaps affixing a pharmaceutical vial to an adjacent pharmaceutical vial. Some embodiments include a single frangible connector within the gap affixing a pharmaceutical vial to an adjacent support. Some embodiments include two or more frangible connectors within one or more gaps affixing a pharmaceutical vial to an adjacent support. The selection and position of the frangible connectors will depend on the embodiment, based on factors including fabrication materials, size and shape of the frangible connectors, mass and relative position of the adjacent pharmaceutical vials within the affixed group, and expected transport and storage conditions. In the embodiment shown in FIG. 3, two frangible connectors 340, 350 are positioned within the gap between the illustrated vials, the frangible connectors 340, 350 affixing the side planar surface of the first pharmaceutical vial 300 to the side planar surface of the adjacent, second pharmaceutical vial, 310.

Figure 4:
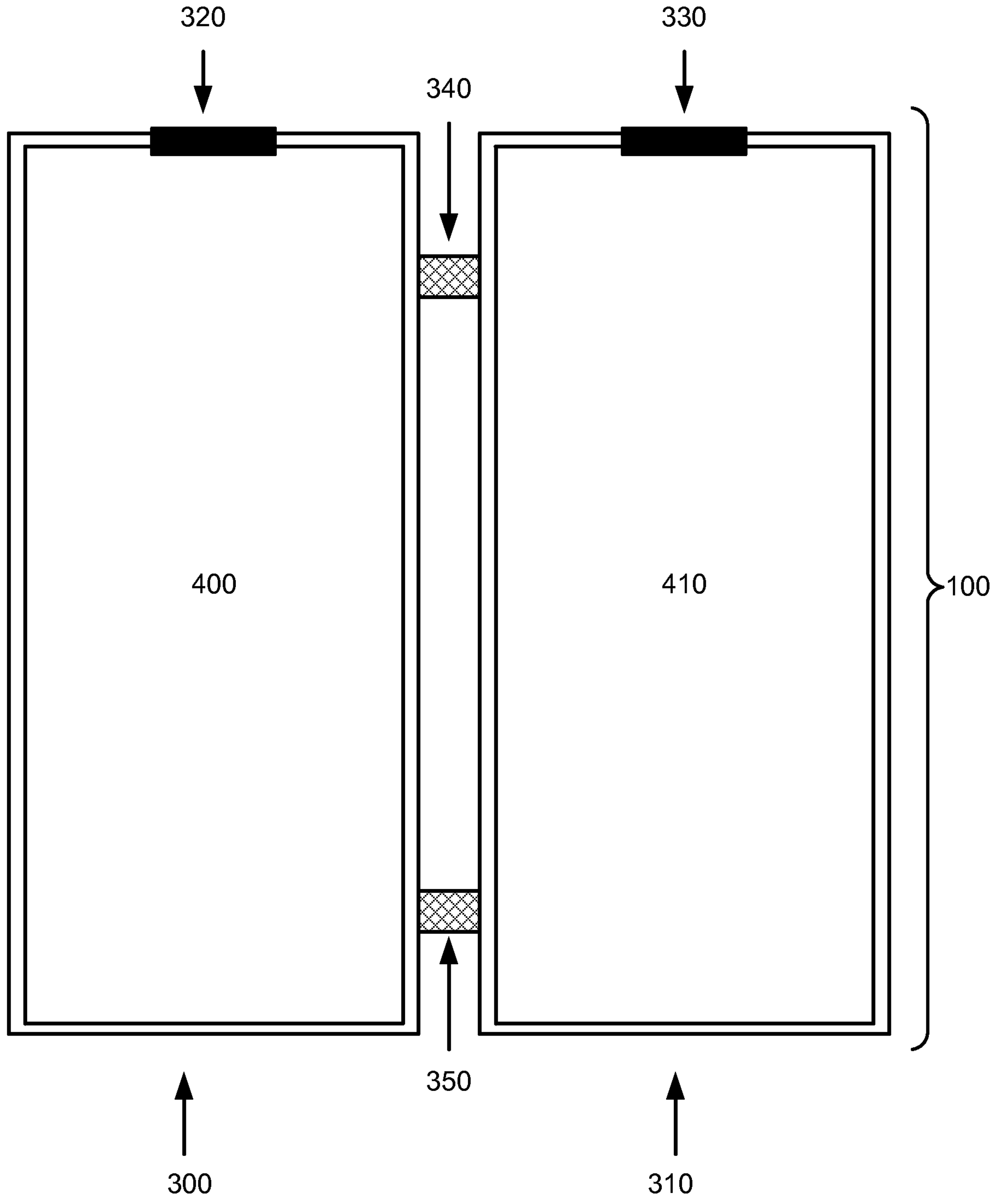
FIG. 4 is a schematic of an affixed group of pharmaceutical vials.

FIG. 4 illustrates a cross-section view of an affixed group of pharmaceutical vials 100. FIG. 4 shows two affixed pharmaceutical vials 300, 310 from a group in a side cross-section view. The affixed group of pharmaceutical vials may include more than two pharmaceutical vials, but only two are shown for purposes of illustration. As shown in FIG. 4, each of the two affixed pharmaceutical vials 300, 310 illustrated from the group include bottom, side, and top walls. The walls of each of the two affixed pharmaceutical vials 300, 310 encircle an internal storage region 400, 410 configured for storage of a pharmaceutical, such as an injectable vaccine. In some embodiments, the walls can be of unequal thickness in order to form an internal storage region with a shape that is distinct from the shape of the external surface structure. For example, some embodiments include walls of tapered thickness positioned to form an internal storage region with an ovoid or conical structure of a size and shape to accept the end of an injection needle during extraction of a liquid pharmaceutical within the storage region. Each of the two affixed pharmaceutical vials 300, 310 include an aperture positioned and configured for access to the internal storage region by an injection needle. The apertures are positioned in the top walls of each of the two affixed pharmaceutical vials 300, 310. In the embodiment shown, each of the two affixed pharmaceutical vials 300, 310 include a seal 320, 330 affixed to the aperture, the seal including a region configured for piercing by the injection needle. Some embodiments include a seal that is a pharmaceutical stopper. For example, in some embodiments an affixed group of pharmaceutical vials each include an access aperture and a pharmaceutical stopper affixed to the access aperture, the pharmaceutical stopper configured to improve the extent of extraction of a liquid pharmaceutical in a storage region within an affixed pharmaceutical vial.

In some embodiments, a plurality of pharmaceutical vials within an affixed group includes an internal storage region configured for storage of a pharmaceutical, the internal storage region including a bottom wall, wherein the bottom wall forms a concave surface of a size and shape to accept the tip of an injection needle. For example, in some embodiments a bottom wall of an internal storage region is substantially conical. In some embodiments, a bottom wall of an internal storage region is structurally formed with a concave internal surface. Some embodiments include an insert affixed to the bottom wall of the pharmaceutical vial at a position within the storage region of the vial, the insert forming a concave internal surface against the bottom wall. An insert can be fabricated, for example, from a plastic material. An insert can be fabricated, for example, from a translucent or transparent material. An insert can be fabricated, for example, as part of the vial manufacturing process. An insert can be positioned, for example, during a manufacturer's fill-finish operations. A plurality of pharmaceutical vials within an affixed group including a bottom wall of an internal storage region with a concave internal surface can be used, for example, with an injection needle and attached syringe that are of a size to permit a user of the system to reach pharmaceutical liquid at the lowest surface of the concave bottom wall with the tip of the injection needle.

In some embodiments, a plurality of pharmaceutical vials within an affixed group includes a seal affixed to each of the pharmaceutical vials, the seal including a region configured for piercing by the injection needle on an exterior surface, and a corresponding concave region on an opposing interior surface of the seal. For example, a concave region in an interior surface of a seal can be of a size and shape to hold a liquid pharmaceutical for withdrawal by an injection needle positioned traverse to the seal when the pharmaceutical vial is inverted during use. In some embodiments, a plurality of pharmaceutical vials within an affixed group includes a translucent seal affixed to each of the pharmaceutical vials, the translucent seal including a region configured for piercing by the injection needle. For example, the translucent seal can be configured to allow a user of the plurality of pharmaceutical vials within an affixed group to visualize the location of an inserted injection needle traversing the translucent seal. In some embodiments, a translucent seal is substantially transparent. A transparent and/or translucent seal can be fabricated, for example, from a plastic material.

Figure 5:
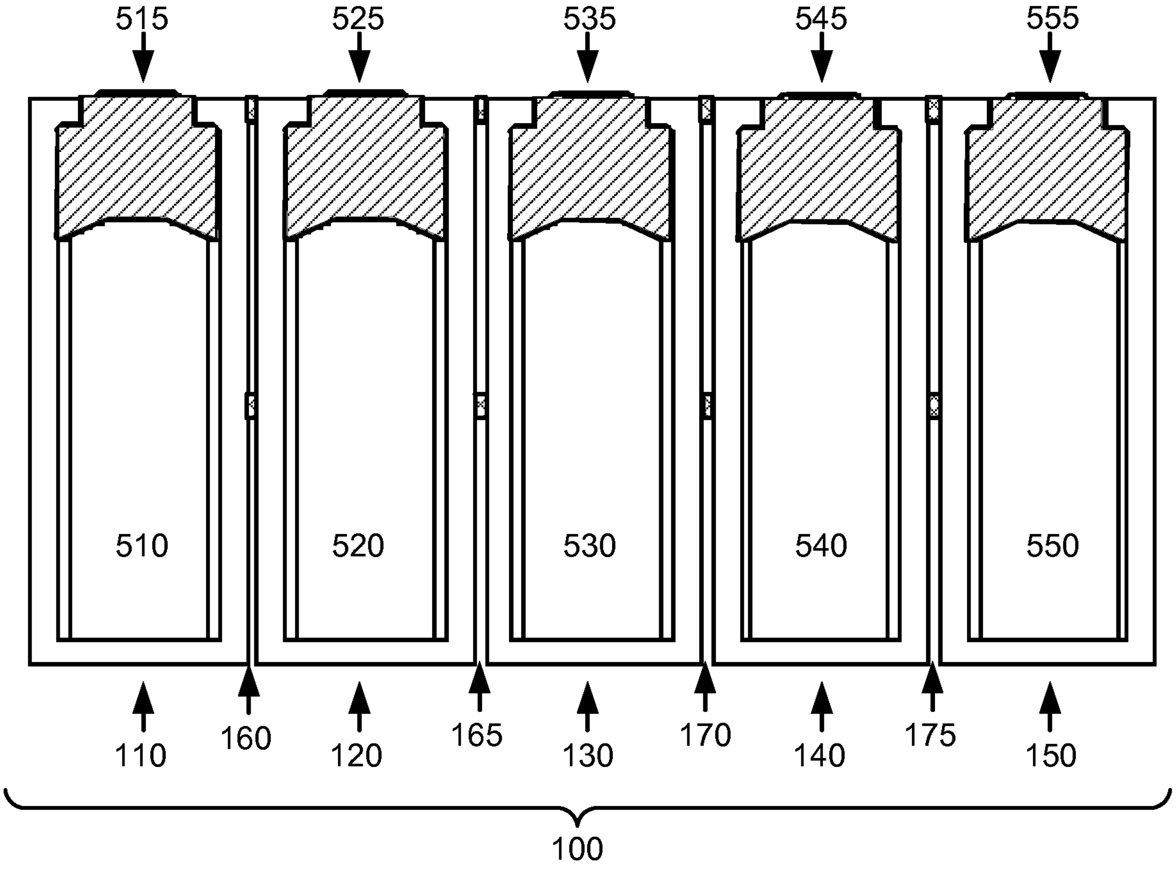
FIG. 5 is a schematic of an affixed group of pharmaceutical vials.

FIG. 5 illustrates a plurality of pharmaceutical vials within an affixed group of pharmaceutical vials 100. The affixed group of pharmaceutical vials 100 is illustrated in a side cross-section view. In the embodiment illustrated, the affixed group of pharmaceutical vials 100 include five individual pharmaceutical vials 110, 120, 130, 140 and 150 arranged as a linear array. The plurality of pharmaceutical vials within the affixed group of pharmaceutical vials 100 are of a similar size and shape. The plurality of pharmaceutical vials within the affixed group of pharmaceutical vials 100 have approximately the same external dimensions. The plurality of pharmaceutical vials within the affixed group of pharmaceutical vials 100 have approximately the same internal dimensions. The interior storage region 510, 520, 530, 540 and 550 of each of the five individual pharmaceutical vials 110, 120, 130, 140 and 150 are substantially identical to each other. Each of the five individual pharmaceutical vials 110, 120, 130, 140 and 150 include an access aperture in the top wall of the vial, and a seal that is a pharmaceutical stopper 515, 525, 535, 545, 555 affixed to the access aperture. In the embodiment illustrated, the pharmaceutical stoppers 515, 525, 535, 545, 555 affixed to the access apertures are configured with a tapered interior surface in order to allow access and recovery of liquid pharmaceutical within the interior storage regions 510, 520, 530, 540 and 550 by a hypodermic syringe needle configured for injection into a patient.

FIG. 5 illustrates that there is a gap 160, 165, 170, 175 positioned between each of the five individual pharmaceutical vials 110, 120, 130, 140 and 150 and the adjacent vial(s). For example, there is a gap 160 positioned between the pharmaceutical vial 110 shown on the far left of the linear array of the affixed group of pharmaceutical vials 100 and the adjacent vial 120. Similarly, there is a gap 165 between the vial 120 second from the left and the center vial 530 in the illustration. Each of the gaps 160, 165, 170, 175 are evenly positioned. Each of the gaps 160, 165, 170, 175 are approximately the same width. Each of the five individual pharmaceutical vials 110, 120, 130, 140 and 150 have external surfaces positioned in parallel with the adjacent vial, so that the gaps 160, 165, 170, 175 are of equal width along their entire length. A pair of frangible connectors are positioned in each of the gaps, the frangible connectors positioned distal to each other. Spacing and positioning of frangible connectors along the length of the gap can, for example, assist in stability of the group of affixed pharmaceutical vials. Some embodiments include one or more frangible connectors within a gap that are a substantially linear projection from the face of the pharmaceutical vial, the projection including a first end affixed to the face of the pharmaceutical vial and a second end affixed to the face of an adjacent pharmaceutical vial within the group of pharmaceutical vials.

Some embodiments include a cover affixed to an outer surface of an affixed group of pharmaceutical vials 100. For example, some embodiments include a cover that is a thin film or paper reversibly attached to the top surface of the affixed group of pharmaceutical vials 100, the cover configured for removal by a user at the time of access of a stored pharmaceutical with an injection needle. Some embodiments include a cover reversibly affixed to at least one external surface of the affixed group of pharmaceutical vials, the cover affixed to the top surface of each of the pharmaceutical vials. Some embodiments include a cover reversibly affixed to at least one external surface of each of the affixed group of pharmaceutical vials, the cover covering an aperture within each of the plurality of pharmaceutical vials. Some embodiments include a cover reversibly affixed to at least one external surface of each of the affixed group of pharmaceutical vials, the cover including at least one RFID tag. Some embodiments include a cover reversibly affixed to at least one external surface of each of the affixed group of pharmaceutical vials, the cover including at least one antenna. Some embodiments include a cover that is connected to the top surface of each of the affixed group of pharmaceutical vials, the cover covering an aperture within each of the plurality of pharmaceutical vials, wherein the cover is configured for piercing by an injection needle. In some embodiments, a cover is positioned over a seal in an aperture within each of the plurality of pharmaceutical vials. In some embodiments, a cover is positioned over a pharmaceutical stopper in an aperture within each of the plurality of pharmaceutical vials.

Some embodiments include: a plurality of pharmaceutical vials with frangible connectors arranged in an affixed group, each pharmaceutical vial including a first exterior side with a first surface configured to reversibly mate with a surface of an external side of an adjacent pharmaceutical vial, each pharmaceutical vial including a second exterior side with a second surface configured to reversibly mate with a surface of a support; a plurality of pharmaceutical vials arranged in an affixed group, each pharmaceutical vial including a first exterior side with a first surface configured to reversibly mate with a surface of an external side of an adjacent pharmaceutical vial, each pharmaceutical vial including a second exterior side with a second surface configured to reversibly mate with a surface of a support; the support including at least one surface configured to reversibly mate with the second surface of each of the plurality of pharmaceutical vials; a first set of frangible connectors positioned between each of the plurality of pharmaceutical vials, wherein at least one frangible connector is affixed to the first surface of each pharmaceutical vial, the at least one frangible connector positioned between each of the pharmaceutical vials and the adjacent pharmaceutical vial and affixing each first surface of a pharmaceutical vial to a first surface of an adjacent pharmaceutical vial; and a second set of frangible connectors positioned between the plurality of pharmaceutical vials arranged in the group and the support, wherein at least one frangible connector is affixed to the second surface of each pharmaceutical vial and to the support, the second set of frangible connectors affixing the plurality of pharmaceutical vials arranged in the affixed group to the support.

Figure 6:
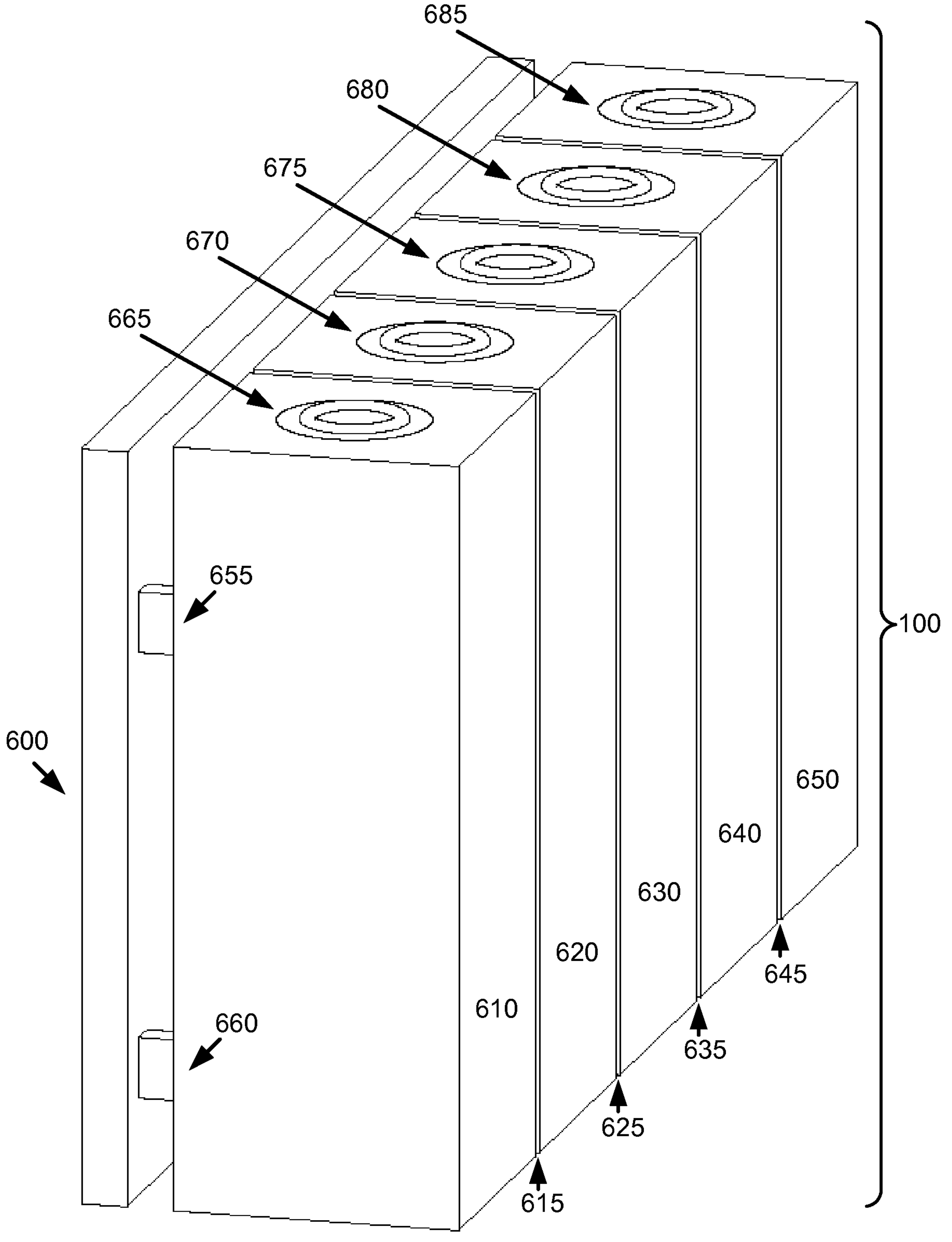
FIG. 6 is a schematic of an affixed group of pharmaceutical vials.

FIG. 6 illustrates aspects of an affixed group of pharmaceutical vials 100. The affixed group of pharmaceutical vials 100 shown in FIG. 6 includes five individual pharmaceutical vials 610, 620, 630, 640, 650. Each of the individual pharmaceutical vials 610, 620, 630, 640, 650 includes an external cuboid structure and a single internal storage region for a pharmaceutical. The affixed group of pharmaceutical vials 100 is positioned as a linear array of the individual pharmaceutical vials 610, 620, 630, 640, 650. A gap 615, 625, 635, 645 is between each of the individual pharmaceutical vials 610, 620, 630, 640, 650 and the adjacent vial in the linear array. A first set of frangible connectors is positioned within each of the gaps 615, 625, 635, 645, the first set of frangible connectors positioned to affix each pharmaceutical vial to the adjacent vial(s). Each of the individual pharmaceutical vials 610, 620, 630, 640, 650 has a top surface, with an aperture positioned in the wall of each of the individual pharmaceutical vials 610, 620, 630, 640, 650. Each aperture in each of the individual pharmaceutical vials 610, 620, 630, 640, 650 includes a seal 665, 670, 675, 680, 685 affixed to the edges of the aperture.

The affixed group of pharmaceutical vials 100 shown in FIG. 6 is attached to a support 600 with a series of frangible connectors. The support 600 is a substantially planar, substantially rectangular structure. In some embodiments, a support is a quadrate structure. In some embodiments, a support is a substantially planar structure of a similar height and width as a linear array of pharmaceutical vials. In some embodiments, a support is a substantially planar structure of a similar height and width as the affixed group of pharmaceutical vials. In some embodiments, a support includes a substantially planar surface configured to reversibly mate with the second surface of each of the plurality of pharmaceutical vials. In some embodiments, a support includes a series of surfaces configured to reversibly mate with the second surface of each of the plurality of pharmaceutical vials. For example, in some embodiments a support includes a series of edges or curves of a size and shape to reversibly fit with an affixed group of pharmaceutical vials. In some embodiments, a support includes a substantially planar surface facing away from the affixed group of pharmaceutical vials. For example, a support can include a surface configured for a pharmaceutical label suitable for the entire affixed group of pharmaceutical vials.

In some embodiments, a support is fabricated from the same or similar material as the pharmaceutical vials and/or frangible connectors in an affixed group of pharmaceutical vials. For example, in some embodiments a support is fabricated from a glass. For example, in some embodiments a support is fabricated from a plastic. In some embodiments, an affixed group of pharmaceutical vials, including the frangible connectors and the support, is fabricated as a single unit, for example in a mold. In some embodiments, an affixed group of pharmaceutical vials, including the frangible connectors and the support, is fabricated as individual components and then connected to each other. For example, an affixed group of pharmaceutical vials can be fabricated from glass and subsequently attached to a surface of a glass support with glass frangible connectors.

FIG. 6 depicts a support 600 that is a substantially planar structure, with a single surface facing the sides of the plurality of pharmaceutical vials in the affixed group 100. The support 600 is positioned with its surface substantially parallel to the facing surfaces of each of the adjacent plurality of pharmaceutical vials in the affixed group 100. A gap is positioned between the surface of the support and the adjacent surfaces of the pharmaceutical vials within the affixed group. A second set of frangible connectors 655, 660 is positioned between the plurality of pharmaceutical vials arranged in the group 100 and the support 600, the second set of frangible connectors affixing the plurality of pharmaceutical vials arranged in the affixed group to the support. Frangible connectors are affixed to the second surface of each pharmaceutical vial and to the support. For example, two frangible connectors 655, 660 are connected to the facing surfaces of the support 600 and the adjacent surface of the end pharmaceutical vial 610 in the illustration of FIG. 6. In the embodiment shown in FIG. 6, two frangible connectors 655, 660 are positioned distally to each other within the gap between the support 600 and the end pharmaceutical vial 610.

Figure 7:
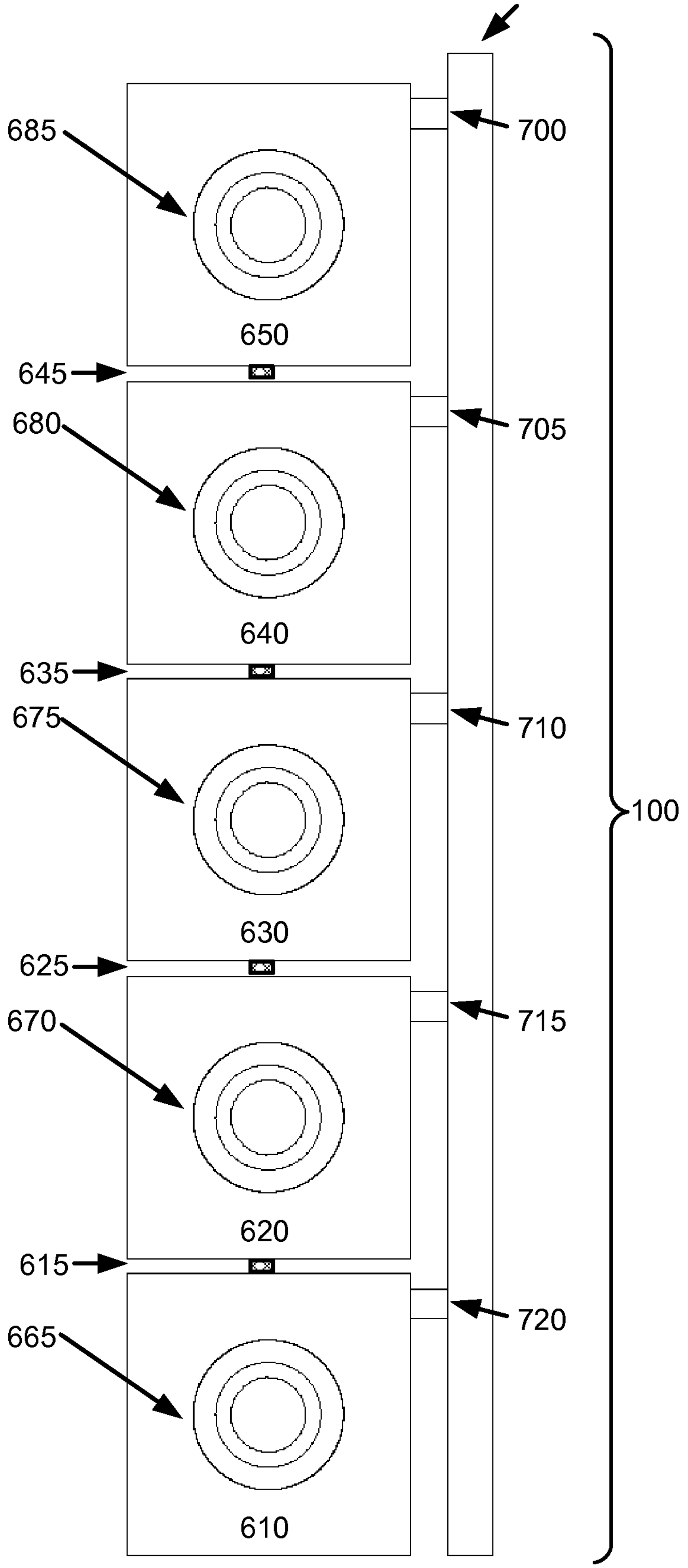
FIG. 7 is a schematic of an affixed group of pharmaceutical vials.

FIG. 7 illustrates an affixed group of pharmaceutical vials 100 connected to a support, shown in a top-down view. The pharmaceutical vials 610, 620, 630, 640, 650 in the affixed group are positioned in a linear array. Each of the pharmaceutical vials 610, 620, 630, 640, 650 in the affixed group is substantially cuboid, with substantially rectangular top surfaces visible in FIG. 7. The external facing surfaces of the pharmaceutical vials 610, 620, 630, 640, 650 in the affixed group are substantially planar and positioned in parallel to each other. A gap 615, 625, 635, 645 is present between the external facing surfaces of the pharmaceutical vials 610, 620, 630, 640, 650 in the affixed group. A frangible connector is present in the gap between each of the adjacent surfaces of the external facing surfaces of the pharmaceutical vials 610, 620, 630, 640, 650 in the affixed group.

A support 600 includes a substantially planar surface positioned in parallel to the facing surfaces of the pharmaceutical vials 610, 620, 630, 640, 650 in the affixed group shown in FIG. 7. A frangible connector 720, 715, 710, 705, 700 is positioned between the surface of the support 600 and the facing surfaces of the pharmaceutical vials 610, 620, 630, 640, 650 in the affixed group. The frangible connectors 720, 715, 710, 705, 700 connect each of the pharmaceutical vials 610, 620, 630, 640, 650 in the affixed group to the facing surface of the support 600. The frangible connectors 720, 715, 710, 705, 700 are positioned at a distal edge of the facing surfaces of the pharmaceutical vials 610, 620, 630, 640, 650 in the affixed group. This positioning can, for example, make it easier for a user, such as a medical professional, to remove an individual vial from the affixed group. A person holding an affixed group of pharmaceutical vials 610, 620, 630, 640, 650 such as illustrated in FIG. 7 in their right hand can, for example, position their thumb to be able to put pressure on each of the pharmaceutical vials 610, 620, 630, 640, 650 in order to snap the frangible connectors and remove the vials in series from the affixed group. A user could, for example, put their thumb against the left surface of the top pharmaceutical vial 650 in the linear array as shown in FIG. 7 and exert pressure from their thumb against the surface in a direction substantially upward and to the right relative to FIG. 7, thereby breaking the frangible connectors to remove the top pharmaceutical vial 650 in the linear array from the group.

Some embodiments include one or more covers reversibly affixed to a surface of a pharmaceutical vial within the affixed array. For example, some embodiments include a cover reversibly affixed to at least one external surface of each of the affixed group of pharmaceutical vials, the cover affixed to the top surface of each of the pharmaceutical vials. For example, some embodiments include a cover reversibly affixed to at least one external surface of each of the affixed group of pharmaceutical vials, the cover covering an aperture within each of the plurality of pharmaceutical vials. For example, some embodiments include a cover reversibly affixed to at least one external surface of each of the affixed group of pharmaceutical vials, the cover including at least one RFID tag. For example, some embodiments include a cover reversibly affixed to at least one external surface of each of the affixed group of pharmaceutical vials, the cover including at least one antenna.

Some embodiments include an affixed group of pharmaceutical vials, including: a plurality of pharmaceutical vials arranged as an affixed group of pharmaceutical vials, each pharmaceutical vial including a first exterior side with a first surface configured to reversibly mate with a surface of an external side of an adjacent pharmaceutical vial, each pharmaceutical vial including a second exterior side with a second surface configured to reversibly mate with a surface of a support, each pharmaceutical vial including a top exterior side including an access aperture; the support including at least one surface configured to reversibly mate with the second surface of each of the plurality of pharmaceutical vials, the support including a non-mating surface facing a position adjacent to the affixed group of pharmaceutical vials; a first set of frangible connectors positioned between the plurality of pharmaceutical vials, wherein at least one frangible connector is affixed to the first surface of each pharmaceutical vial, the at least one frangible connector positioned between each of the pharmaceutical vials and the adjacent pharmaceutical vial and affixing each first surface of a pharmaceutical vial to a first surface of an adjacent pharmaceutical vial; a second set of frangible connectors positioned between the plurality of pharmaceutical vials and the support, the second set of frangible connectors affixing the second sides of the plurality of pharmaceutical vials to the support; and a label affixed to the non-mating surface of the support with a label region facing away from the support.

In some embodiments, a plurality of pharmaceutical vials arranged as an affixed group of pharmaceutical vials with an affixed support is fabricated as a plurality of affixed vials, which are subsequently affixed to the support. In some embodiments, an affixed group of pharmaceutical vials are fabricated using a blow-mold process. In some embodiments, an affixed group of pharmaceutical vials are fabricated using a blow-mold process that is a blow-fill-seal process. In some embodiments wherein the plurality of pharmaceutical vials arranged as an affixed group of pharmaceutical vials with an affixed support is fabricated using a blow-mold process, the support is fabricated in conjunction with the plurality of pharmaceutical vials. For example, in some embodiments, a plurality of pharmaceutical vials arranged as an affixed group of pharmaceutical vials with an affixed support is fabricated as a single unit. For example, in some embodiments a plurality of pharmaceutical vials arranged as an affixed group of pharmaceutical vials with an affixed support is molded as a single unit, including the support, and subsequent to molding, as a final fabrication step, the support is moved into position relative to the affixed group of vials. For example, in some embodiments, a plurality of pharmaceutical vials arranged as an affixed group of pharmaceutical vials with an affixed support is molded as a single unit, wherein the support is positioned adjacent to a lower edge of the affixed group of vials during molding, and then the support is bent or repositioned to a desired location after molding. A blow-molded support can be connected to one or more vials with frangible connectors during the molding process. In some embodiments, a blow-molded support can be connected to one or more vials with frangible connectors during the molding process and then the frangible connectors bent or reconfigured to reposition the support into a final orientation relative to the affixed group of pharmaceutical vials. For example, some embodiments include a frangible connector that is fabricated from a molded plastic.

Some embodiments include: a second plurality of pharmaceutical vials forming an additional affixed group of pharmaceutical vials with frangible connectors, each pharmaceutical vial including a first exterior side with a surface configured to reversibly mate with a surface of an external side of an adjacent pharmaceutical vial, each pharmaceutical vial including a second exterior side with a surface configured to reversibly mate with a surface of the support, the second plurality of pharmaceutical vials positioned in parallel to the affixed group of pharmaceutical vials, with the support positioned between the affixed group of pharmaceutical vials and the additional affixed group of pharmaceutical vials; a third set of frangible connectors positioned between the plurality of pharmaceutical vials arranged in the additional affixed group of pharmaceutical vials, wherein at least one frangible connector is affixed to the first surface of each pharmaceutical vial, the at least one frangible connector positioned between each of the pharmaceutical vials and the adjacent pharmaceutical vial and affixing each first surface of a pharmaceutical vial to a first surface of an adjacent pharmaceutical vial; and a fourth set of frangible connectors positioned between the plurality of pharmaceutical vials arranged in the additional affixed group of pharmaceutical vials and the support, the fourth set of frangible connectors affixing the second sides of the plurality of pharmaceutical vials in the additional affixed group of pharmaceutical vials to the support. For example, the first plurality of pharmaceutical vials and the second plurality of pharmaceutical vials can be arranged as two even and parallel columns of pharmaceutical vials, with a substantially planar support structure positioned between the columns, with the long axis of the support substantially parallel to the two even and parallel columns of pharmaceutical vials. The support can include a label affixed to the top and/or side edges of the support, and one or more tabs attached to the edge of the label and reversibly affixed to a surface of each of the pharmaceutical vials.

Figure 8:
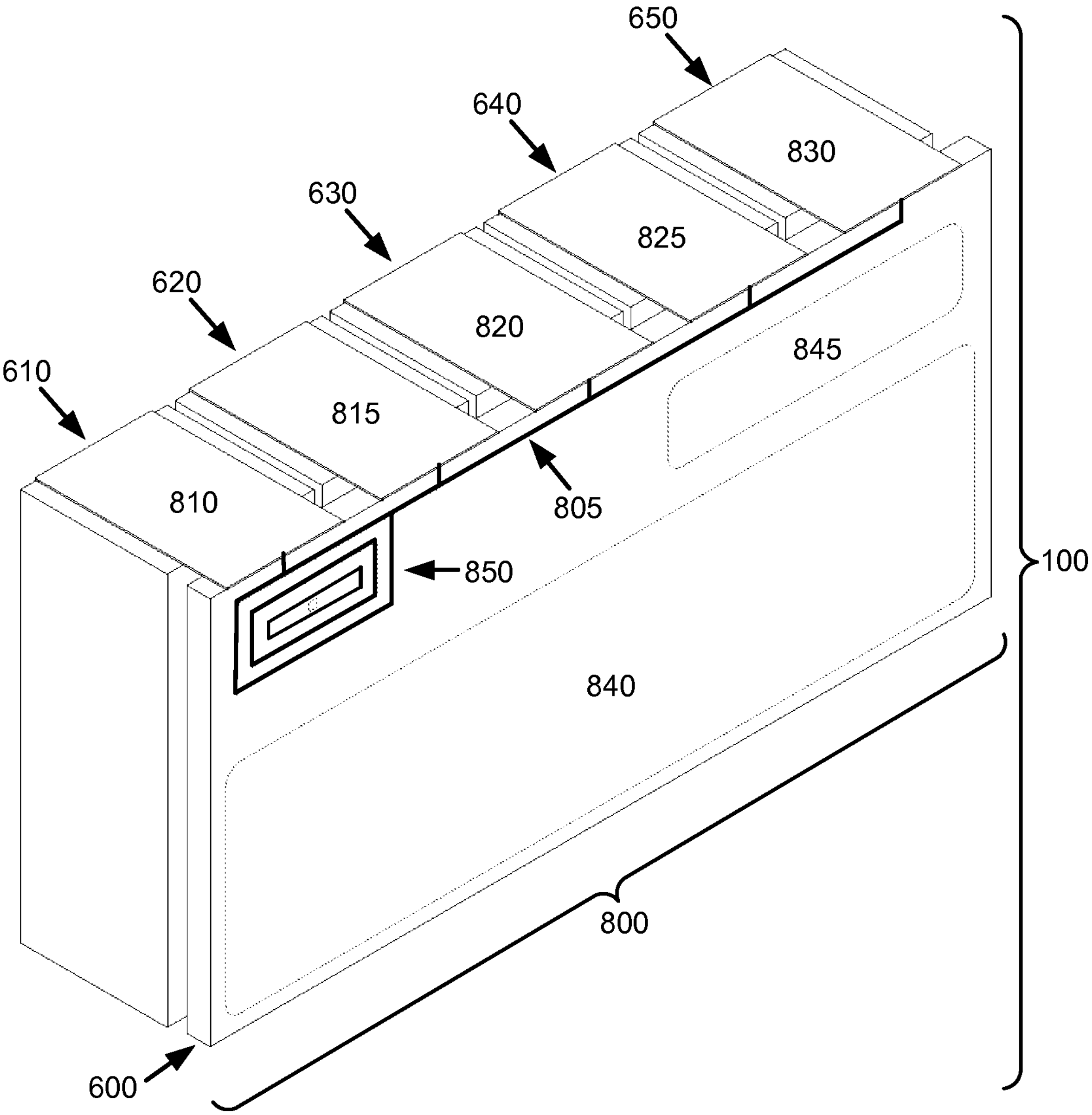
FIG. 8 is a schematic of an affixed group of pharmaceutical vials.

FIG. 8 illustrates an affixed group of pharmaceutical vials 100 with frangible connectors. The affixed group of pharmaceutical vials 100 includes five substantially cuboid pharmaceutical vials 610, 620, 630, 640, 650 arranged as a linear array. The pharmaceutical vials 610, 620, 630, 640, 650 in the affixed group of pharmaceutical vials 100 each have substantially planar exterior surfaces positioned in parallel with the adjacent pharmaceutical vial(s). For example, pharmaceutical vial 610 has a single surface facing a parallel surface of the adjacent vial 620. For example, pharmaceutical vial 620 includes a surface positioned in parallel to pharmaceutical vial 610 and an opposing surface positioned in parallel to pharmaceutical vial 630. A first set of frangible connectors is positioned between the plurality of pharmaceutical vials 610, 620, 630, 640, 650 in the affixed group 100. Frangible connectors affix each vial to the adjacent vial(s) in the affixed group 100. A second set of frangible connectors is positioned between the plurality of pharmaceutical vials 610, 620, 630, 640, 650 and the support 600. The second set of frangible connectors are sized, shaped and positioned to affix the second sides of the plurality of pharmaceutical vials 610, 620, 630, 640, 650 to the support 600.

The embodiment shown in FIG. 8 includes a label 800 affixed to the non-mating surface of the support 600 with a label region facing away from the support 600. The label 800 includes a first region 840 positioned to be readily visible to a user. For example, in some embodiments a first region 840 of a label 800 can include specific information identifying one or more pharmaceuticals stored in the affixed group of pharmaceutical vials 100, and/or use information regarding the one or more pharmaceuticals. The label 800 includes a second region 845, also positioned to be readily visible to a user. The second region 845 of the label can include additional information regarding one or more pharmaceuticals stored within the affixed group of pharmaceutical vials 100, for example an expiration date, a packing date, manufacture date, or other information. In some embodiments a second region of a label can include a vial monitor, such as a vaccine vial monitor for temperature exposure. See the World Health Organization (WHO) document titled "Getting Started with Vaccine Vial Monitors; Vaccines and Biologicals" dated December 2002 and the WHO document titled "Getting Started with Vaccine Vial Monitors—Questions and Answers on Field Operations," Technical Session on Vaccine Vial Monitors, Mar. 27, 2002, Geneva, which are herein incorporated by reference.

In the embodiment illustrated in FIG. 8, the label 800 affixed to the non-mating surface of the support 600 includes a plurality of tabs 810, 815, 820, 825, 830 affixed to an edge of the label 800. In the embodiment shown, each of the plurality of tabs 810, 815, 820, 825, 830 is affixed to an edge of the label 800 at a position adjacent to the top side of the support 600. In the embodiment shown in FIG. 8, one of the plurality of tabs 810, 815, 820, 825, 830 is reversibly affixed to the top exterior side of each of the plurality of pharmaceutical vials 610, 620, 630, 640, 650 in the affixed group 100.

Each tab is a substantially rectangular, planar structure affixed to the edge of the label. Each tab has an external-facing surface area that is substantially smaller than the external-facing surface area of the label. Each tab is of a size and shape to cover at least a region of the top surface of a single pharmaceutical vial. For example, in some embodiments, each tab is positioned and sized to cover substantially all of the top surface of a single pharmaceutical vial in the affixed group. For example, in some embodiments, each tab is positioned and sized to cover a substantial percentage of the top surface of a single pharmaceutical vial in the affixed group. In some embodiments, each tab is positioned and sized to cover more than 50%, more than 60%, more than 70%, more than 80%, or more than 90% of the top surface of a single pharmaceutical vial. For example, in some embodiments, each tab is positioned and sized to cover a less than half of the top surface of a single pharmaceutical vial in the affixed group. In some embodiments, each tab is positioned and sized to cover less than 50%, less than 40%, less than 30%, less than 20%, or less than 10% of the top surface of a single pharmaceutical vial. Some embodiments include wherein the plurality of tabs are removable from the label, such as to form covers on the individual pharmaceutical vials when they are removed from the affixed group prior to use. Some embodiments include wherein the plurality of tabs include perforations along a section of the tab adjacent to the label, the perforations configured to allow for removal of the tab from the label at the same time that the attached pharmaceutical vial is removed from the affixed group. Some embodiments include a tab reversibly affixed to the top surface of each of the pharmaceutical vials and covering an aperture within the top surface of each of the plurality of pharmaceutical vials. For example, each tab can be of a size and shape to cover an aperture in the top surface of a single pharmaceutical vial. In some embodiments, a tab is affixed to a top surface of each of the pharmaceutical vials with a sterile seal, configured to reduce possible contamination at the top surface.

Some embodiments of an affixed group of pharmaceutical vials attached to a support and a label covering the support also include at least one RFID device affixed to the label. In the embodiment shown in FIG. 8, for example, the label 800 affixed to the non-mating surface of the support 600 includes a RFID device 850 affixed to the label 800. The RFID device 850 shown in the embodiment illustrated in FIG. 8 is a passive RFID device, or a passive RFID tag. Some embodiments include an RFID device including a battery, or an active RFID tag. Some embodiments include an RFID device that is a semi-active RFID tag. A RFID device attached to a label of an affixed group of pharmaceutical vials can, for example, be configured for tracking and inventory management of the affixed group of pharmaceutical vials. A RFID device attached to a label of an affixed group of pharmaceutical vials can, for example, be configured for specific identification of the affixed group of pharmaceutical vials, for example, for identification of the specific batch or processing group of a pharmaceutical stored in the affixed group of vials.

Some embodiments of an affixed group of pharmaceutical vials attached to a support and a label covering the support also include a pharmaceutical bar code positioned within the label region of the label, and a plurality of tabs affixed to an edge of the label, one of the plurality of tabs reversibly affixed to the top exterior side of each of the plurality of pharmaceutical vials, each of the tabs including a machine-readable identifier affixed to an external surface of the tab. For example, in the embodiment shown in FIG. 8, the label 800 affixed to the non-mating surface of the support 600 includes a first region 840 and a second region 845. In some embodiments, the first region 840 includes a written description of a pharmaceutical stored within the group of affixed pharmaceutical vials 100, and the second region 845 includes a machine-readable bar code providing machine-readable information about the pharmaceutical stored within the group of affixed pharmaceutical vials 100. In some embodiments, the top, outward-facing surface of each of the plurality of tabs 810, 815, 820, 825, 830 affixed to the top edge of the label 800 includes a machine-readable code visible on the outward-facing surface. For example, in some embodiments the outward-facing surface of each of the plurality of tabs includes a QR code. For example, in some embodiments the outward-facing surface of each of the plurality of tabs includes a proprietary code, such as a code specific to a pharmaceutical manufacturer or supply chain.

Figure 9:
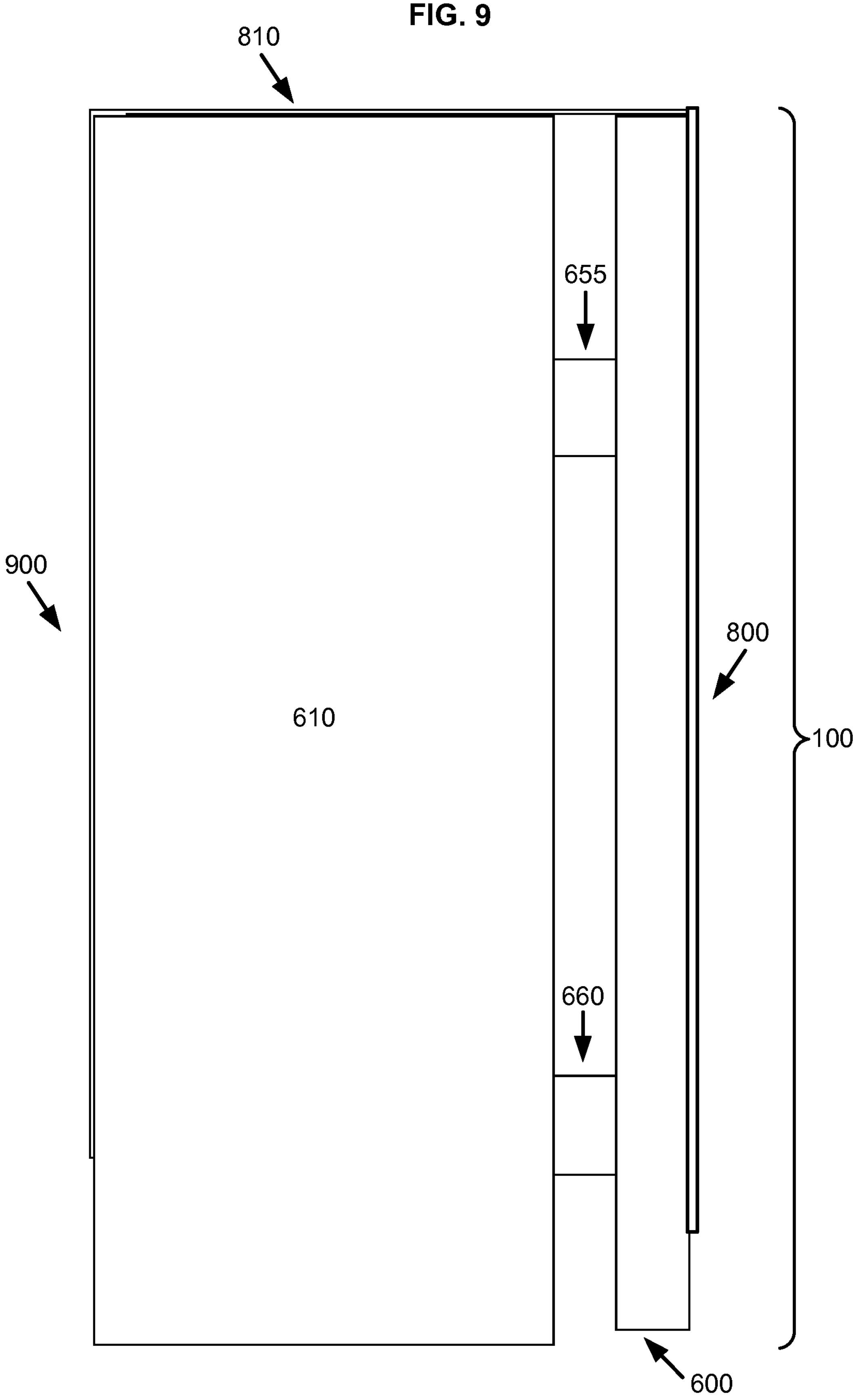
FIG. 9 is a schematic of an affixed group of pharmaceutical vials.

FIG. 9 illustrates an embodiment of an affixed group of pharmaceutical vials 100 shown in a side view. From the viewpoint shown, only an end pharmaceutical vial 610 is visible. The pharmaceutical vial 610 includes a substantially planar exterior surface facing a substantially planar surface of a support 600. Two frangible connectors 655, 660 affix the substantially planar exterior surface of the pharmaceutical vial 610 to the substantially planar surface of the support 600. A label 800 is affixed to the outward-facing surface of the support 600. In the embodiment shown in FIG. 9, a tab 810 is attached to the edge of the label 800. The tab 810 is reversibly affixed to the top surface of the pharmaceutical vial 610. The tab 810 also includes a front-facing section 900 that is reversibly affixed to the front face of the pharmaceutical vial. The front-facing section 900 of the tab 810 is reversibly affixed to the external surface of the pharmaceutical vial on the side opposing the side of the pharmaceutical vial 610 facing a surface of the support 600. In some embodiments, a tab 810 is attached to a front-facing section 900 that is sized and shaped for a user to grasp. For example, a front-facing section can be sized and shaped for a person to hold the section with their fingers for removal of the section and the tab from the surfaces of the pharmaceutical vial. In some embodiments, a front-facing section of a tab includes a pull region, shaped and sized for a person to grasp with their fingers and pull the tab from the surface.

Figure 10:
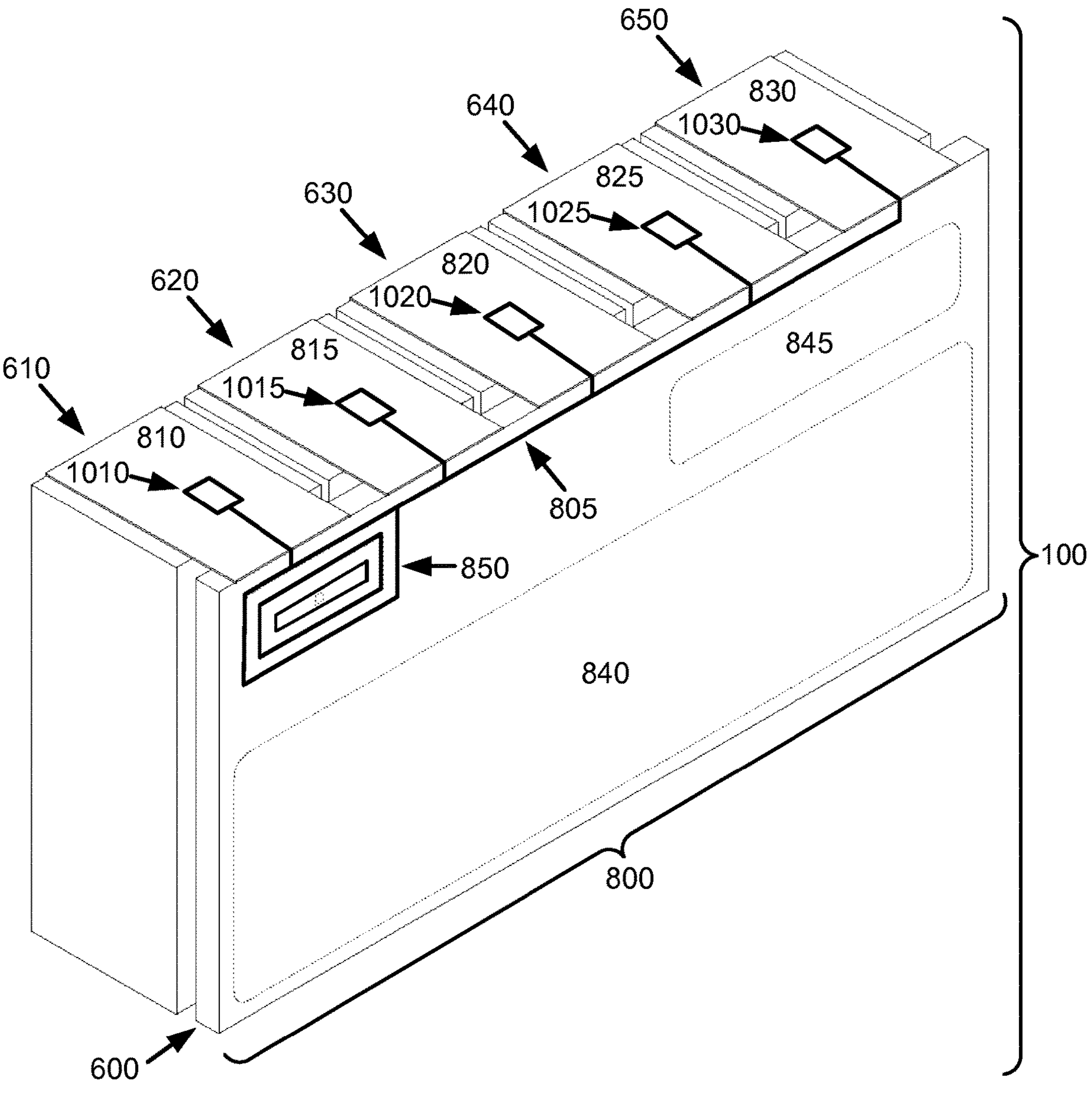
FIG. 10 is a schematic of an affixed group of pharmaceutical vials.

FIG. 10 depicts an embodiment of an affixed group of pharmaceutical vials 100. The affixed group of pharmaceutical vials 100 include five individual pharmaceutical vials, 610, 620, 630, 640, 650 arranged as a linear array. The adjacent surfaces of the adjoining vials are positioned substantially parallel to each other, with a gap between the vials. A first set of frangible connectors connect the affixed group of pharmaceutical vials 100 to each other. A second set of frangible connectors connect the affixed group of pharmaceutical vials 100 to a support 600. The support 600 is a substantially planar structure with height and width dimensions that substantially conform to the height and width of the affixed group of pharmaceutical vials 100. A label 800 is affixed to the outward-facing surface of the support 600, on a surface of the support 600 opposing the surface adjacent to the five individual pharmaceutical vials, 610, 620, 630, 640, 650 arranged as a linear array. The label includes a first region 840 and a second region 845, each region positioned to be readily visible to a user. A plurality of tabs 810, 815, 820, 825, 830 are attached to the edge of the label 800 and each tab includes a lower surface affixed to the top surface of each of the five individual pharmaceutical vials, 610, 620, 630, 640, 650.

Some embodiments of an affixed group of pharmaceutical vials attached to a support and a label covering the support also include at least one RFID device affixed to the label and a RFID attenuator affixed to each of the plurality of tabs, the RFID attenuator connected to the RFID device. FIG. 10 illustrates a plurality of pharmaceutical vials 610, 620, 630, 640, 650 in an affixed group 100 including a support 600. The support 600 includes a label 800 attached to an externally-facing surface of the support 600. An RFID device 850 is attached to the label 800. An attenuator 805 is connected to the RFID device 850. An attenuator, as used herein, refers to a structural feature attached to the label that measurably alters the resonance of the RFID device when the attenuator is connected to the RFID device. For example, in some embodiments an attenuator includes a section of metal foil attached to each of the plurality of tabs attached to the label, and a frangible wire connecting each of the sections of metal foil with the RFID device. For example, in some embodiments an attenuator includes a thin metallic strip affixed to the label, the thin metallic strip in physical contact with an antenna within the RFID device.

In the embodiment illustrated in FIG. 10, a RFID device 850 is attached to the label 800. An attenuator 805 is connected to the RFID device 850. In addition, each individual tab 810, 815, 820, 825, 830 has a tab-specific attenuator 1010, 1015, 1020, 1025, 1030 attached to the individual tab 810, 815, 820, 825, 830, the individual tab 810, 815, 820, 825, 830 connected to the attenuator 805 affixed to the label. Each tab-specific attenuator attached to an individual tab is configured to alter the resonance of the RFID device when the tab is removed from the affixed group of pharmaceutical vials with the removal of the individual pharmaceutical vial affixed to the tab. For example, in some embodiments an attenuator includes a section of metal foil attached to each of the tab-specific attenuators attached to the plurality of tabs, and a frangible wire connecting each of the sections of metal foil with the RFID device. For example, in some embodiments an attenuator includes a thin metallic strip attached to each of the tab-specific attenuators attached to the plurality of tabs, the thin metallic strip in physical contact with an antenna within the RFID device.

Some embodiments include a method of inventory assistance for pharmaceutical vials in an affixed group of pharmaceutical vials, the method including the steps of: removing, from a pharmaceutical storage unit including a RFID reader device, a group of pharmaceutical vials affixed to each other with at least one frangible connector, the group of affixed pharmaceutical vials including a label with an affixed RFID device and a plurality of tabs reversibly affixed to a top surface of each of the affixed pharmaceutical vials, a RFID attenuator affixed to each of the plurality of tabs, each RFID attenuator connected to the RFID reader device; breaking at least one frangible connector with physical force to separate a pharmaceutical vial with the reversibly affixed tab and the RFID attenuator from the group of pharmaceutical vials; removing the separated pharmaceutical vial from the affixed group of pharmaceutical vials; and returning the affixed group of pharmaceutical vials to the storage unit. For example, a medical professional can utilize the method of inventory assistance for pharmaceutical vials in an affixed group of pharmaceutical vials during a day, in order to assist the medical professional to see easily the inventory of the pharmaceutical on hand at any given time. For example, a medical professional can utilize the method of inventory assistance for pharmaceutical vials in an affixed group of pharmaceutical vials at the end of a shift, in order to assist the medical professional to see easily the inventory of the pharmaceutical on hand at the end of the shift.

Some embodiments include a method of inventory assistance for pharmaceutical vials in an affixed group of pharmaceutical vials, the method including the steps of: sending a RFID signal within a pharmaceutical storage unit from a RFID reader device within the pharmaceutical storage unit; receiving a return RFID signal; comparing the received RFID signal to a set of standard RFID signals to determine if there was an alteration in the received RFID signal corresponding to a change in the RFID device and attached RFID attenuator on an affixed group of pharmaceutical vials. For example, in some embodiments a pharmaceutical storage unit, for example, a medical refrigerator, includes a RFID reader adapted for inventory management of multiple affixed groups of pharmaceutical vials as well as the vials within the affixed groups. In some embodiments an affixed group of pharmaceutical vials is configured so that when a medical professional removes a pharmaceutical vial from an affixed group of pharmaceutical vials, then returns the remainder of the affixed group to a pharmaceutical storage unit, the pharmaceutical storage unit activates a RFID reader integral to the storage unit to query the RFID devices within the storage unit for inventory purposes. For example, a system including a RFID reader integral to a pharmaceutical storage unit can be configured to detect changes in an RFID device signal due to an alteration in an attached attenuator from removal of a pharmaceutical vial from an affixed group of pharmaceutical vials.

Some embodiments include a method of inventory assistance for pharmaceutical vials in an affixed group of pharmaceutical vials, the method including the steps of: sending a pharmaceutical bar code scanner signal within a pharmaceutical storage unit from a pharmaceutical bar code scanner device within the pharmaceutical storage unit; receiving a return pharmaceutical bar code signal; comparing the received pharmaceutical bar code signal to a set of pharmaceutical bar codes in memory; identifying a pharmaceutical from comparison of the received signal with the set of pharmaceutical bar codes in memory; sending a machine-readable identifier signal within the pharmaceutical storage unit from the pharmaceutical bar code scanner device within the pharmaceutical storage unit; receiving a return machine-readable identifier signal; comparing the received machine-readable identifier signal to a set of machine-readable identifier signals in memory; and identifying one or more individual pharmaceutical vials present in one or more affixed groups from comparison of the received signal with the set of machine-readable identifier signals in memory. For example, in some embodiments a pharmaceutical storage unit, for example, a medical refrigerator, includes a scanner adapted for inventory management of multiple affixed groups of pharmaceutical vials as well as the vials within the affixed groups. For example, in some embodiments a pharmaceutical storage unit includes a scanner that is a bar code reader. For example, in some embodiments a pharmaceutical storage unit includes a scanner that is a QR code reader. In some embodiments an affixed group of pharmaceutical vials is configured so that when a medical professional removes a pharmaceutical vial from an affixed group of pharmaceutical vials, then returns the remainder of the affixed group to a pharmaceutical storage unit, the pharmaceutical storage unit activates a scanner integral to the storage unit to query the labels within the storage unit for inventory purposes. For example, a scanner can be configured to read a bar code on the label of an affixed group of pharmaceutical vials, and one or more QR codes on a set of tabs affixed to the label.

Those skilled in the art will recognize that at least a portion of the devices and/or processes described herein can be integrated into a data processing system. For example, an affixed group of pharmaceutical vials including a cover and a reflective transponder affixed to the cover can be utilized with a data processing system configured for automated tracking. A data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An affixed group of liquid pharmaceutical vials with breakable connectors, comprising:

a plurality of pharmaceutical vials cuboid shaped and arranged in a linear array with minimal total volume of the linear array during cold chain storage, each liquid pharmaceutical vial including a first exterior side with a first planar surface configured to reversibly mate with a surface of an external side of an adjacent liquid pharmaceutical vial to form a minimal gap between each of the adjacent liquid pharmaceutical vials, wherein the minimal gap between each of the adjacent liquid pharmaceutical vials is of an equal width along a longituide of each liquid pharmaceutical vial, wherein the first planar surface is positioned in parallel with the planar surface of the adjacent liquid pharmaceutical vial, each liquid pharmaceutical vial including a second exterior side with a second planar surface configured to reversibly mate with a surface of a support, the second planar surface extending generally perpendicularly to the first planar surface, each liquid pharmaceutical vial including an internal storage region configured for storage of a liquid pharmaceutical, the internal storage region including a bottom wall, wherein the bottom wall forms a concave surface of a size and shape to accept the tip of an injection needle, each of the liquid pharmaceutical vials having external dimensions of approximately 10 mm wide and 25 mm tall;

the support including at least one surface configured to reversibly mate with the second planar surface of each of the plurality of liquid pharmaceutical vials, the support positioned with the at least one surface parallel to each of the second planar surfaces of the plurality of liquid pharmaceutical vials, wherein the support is of a similar height and width as the linear array;

a first set of breakable connectors positioned between each of the plurality of liquid pharmaceutical vials, wherein at least one breakable connector is affixed to the first planar surface of each pharmaceutical vial, the at least one breakable connector positioned between each of the liquid pharmaceutical vials and the adjacent liquid pharmaceutical vial and affixing each first planar surface of a liquid pharmaceutical vial to a first surface of an adjacent pharmaceutical vial, the first set of breakable connectors of a size and shape to fix the minimal gap between each of the adjacent liquid pharmaceutical vials; and a second set of breakable connectors positioned between the plurality of liquid pharmaceutical vials arranged in the affixed group and the support, wherein at least one breakable connector is affixed to the second surface of each liquid pharmaceutical vial and to the support, the second set of breakable connectors affixing the plurality of pharmaceutical vials arranged in the affixed group to the support, the second set of breakable connectors of a size and shape to fix a minimal gap between each of the liquid pharmaceutical vials and the support.

2. The affixed group of liquid pharmaceutical vials of claim 1, wherein each of the plurality of liquid pharmaceutical vials arranged in a group comprise:

an access aperture; and a liquid pharmaceutical stopper affixed to the access aperture, the liquid pharmaceutical stopper configured to permit extraction of a liquid pharmaceutical in a storage region within an affixed pharmaceutical vial.

3. The affixed group of liquid pharmaceutical vials of claim 1, wherein each of the plurality of liquid pharmaceutical vials comprise:

an internal storage region configured for storage of a liquid pharmaceutical; and an aperture positioned and configured for access to the internal storage region by an injection needle.

4. The affixed group of liquid pharmaceutical vials of claim 1, wherein each of the plurality of liquid pharmaceutical vials comprise:

an internal storage region configured for storage of a liquid pharmaceutical;

an aperture positioned and configured for access to the internal storage region by an injection needle; and a liquid seal affixed to the aperture, the liquid seal including a region configured for piercing by the injection needle.

5. The affixed group of liquid pharmaceutical vials of claim 1, wherein the plurality of liquid pharmaceutical vials comprise:

a translucent liquid seal affixed to each of the liquid pharmaceutical vials, the translucent liquid seal including a region configured for piercing by the injection needle.

6. The affixed group of liquid pharmaceutical vials of claim 1, wherein the support comprises: a substantially planar structure.

7. The affixed group of liquid pharmaceutical vials of claim 1, wherein the support comprises:

a substantially planar surface configured to reversibly mate with the second surface of each of the plurality of liquid pharmaceutical vials.

8. The affixed group of liquid pharmaceutical vials of claim 1, wherein the first set of frangible connectors comprises:

a substantially linear projection from the surface of the liquid pharmaceutical vial, the projection including a first end affixed to the surface of the liquid pharmaceutical vial and a second end affixed to the surface of an adjacent pharmaceutical vial within the group of liquid pharmaceutical vials; and a breakable connection region between the first end and the second end, wherein the breakable connection is of a size, shape and position to be broken by hand by a user.

9. The affixed group of liquid pharmaceutical vials of claim 1, wherein the second set of breakable connectors comprises:

a substantially linear projection from the surface of the liquid pharmaceutical vial, the projection including a first end affixed to the surface of the liquid pharmaceutical vial and a second end affixed to the surface of the support; and a breakable connection region between the first end and the second end, wherein the breakable connection is of a size, shape and position to be broken by hand by a user.

10. The affixed group of liquid pharmaceutical vials of claim 1, further comprising:

a plurality of liquid pharmaceutical vials arranged in a second linear array, each liquid pharmaceutical vial including a first exterior side with a planar surface configured to reversibly mate with a surface of an external side of an adjacent liquid pharmaceutical vial, each liquid pharmaceutical vial including a second exterior side with a planar surface configured to reversibly mate with a surface of the support, the second group positioned in parallel to the group with the support positioned between the linear group and the second linear group;

a third set of frangible connectors positioned between the plurality of liquid pharmaceutical vials arranged in the second linear group, wherein at least one breakable connector is affixed the first planar surface of each liquid pharmaceutical vial, the at least one breakable connector positioned between each of the liquid pharmaceutical vials within the second linear array and the adjacent liquid pharmaceutical vial in the second linear array, the third set of breakable connectors of a size and shape to fix a minimal gap between each of the adjacent liquid pharmaceutical vials; and a fourth set of breakable connectors positioned between the plurality of liquid pharmaceutical vials arranged in the second linear array and the support, the fourth set of breakable connectors affixing the plurality of liquid pharmaceutical vials arranged in the second linear array to the support, the fourth set of breakable connectors of a size and shape to fix a minimal gap between each of the liquid pharmaceutical vials in the second linear array and the support.

11. The affixed group of liquid pharmaceutical vials of claim 1, further comprising:

a cover reversibly affixed to at least one external surface of each of the affixed group of liquid pharmaceutical vials, the cover affixed to the top surface of each of the liquid pharmaceutical vials.

12. The affixed group of liquid pharmaceutical vials of claim 1, further comprising:

a cover reveribly affixed to at least one external surface of each of the affixed group of liquid pharmaceutical vials, the cover covering an aperture within each of the plurality of liquid pharmaceutical vials.

13. An affixed group of liquid pharmaceutical vials with breakable connectors, comprising:

a plurality of liquid pharmaceutical vials cuboid shaped and arranged as a linear array of liquid pharmaceutical vials with minimal total volume of the linear array during cold chain storage, each liquid pharmaceutical vial including a first exterior side with a first planar surface configured to reversibly mate with a surface of an external side of an adjacent liquid pharmaceutical vial to form a minimal gap between each of the adjacent liquid pharmaceutical vials, wherein the minimal gap between each of the adjacent liquid pharmaceutical vials is of an equal width along a longitude of each liquid pharamceutical vial, wherein the first planar surface is positioned in parallel with the planar surface of the adjacent liquid pharmaceutical vial, each liquid pharmaceutical vial including a second exterior side with a second planar surface configured to reversibly mate with a surface of a support, the second planar surface extending generally perpendicularly to the first planar surface, each liquid pharmaceutical vial including a top exterior side including an access aperture, each liquid pharmaceuitcal vial including an internal storage region configured for storage of a liquid pharmaceutical, the internal storage region including a bottom wall, wherein the bottom wall forms a concave surface of a size and shape to accept the tip of an injection needle;

the support including at least one planar surface configured to reversibly mate with the second surface of each of the plurality of liquid pharmaceutical vials, the support including a non-mating surface facing a position away from the linear array of liquid pharmaceutical vials;

a first set of breakable connectors positioned between the plurality of liquid pharmaceutical vials, wherein at least one breakable connector is affixed to the first planar surface of each liquid pharmaceutical vial, the at least one breakable connector positioned between each of the liquid pharmaceutical vials and the adjacent liquid pharmaceutical vial and affixing each first planar surface of a liquid pharmaceutical vial to a first planar surface of an adjacent liquid pharmaceutical vial;

a second set of breakable connectors positioned between the plurality of liquid pharmaceutical vials arranged in the affixed group and the support, the second set of breakable connectors affixing the second surfaces of the plurality of liquid pharmaceutical vials arranged in the affixed group to the support with a minimal gap between each of the plurality of vials and the support; and a label affixed to the non-mating surface of the support with a label region facing away from the support;

wherein the support is a substantially planar structure of a similar height and width as the linear array of liquid pharmaceutical vials.

14. The affixed group of liquid pharmaceutical vials of claim 13, wherein each of the plurality of liquid pharmaceutical vials comprise:

an internal liquid storage region configured for storage of a liquid pharmaceutical; and an aperture positioned and configured for access to the internal liquid storage region by ab injection needle.

15. The affixed group of liquid pharmaceutical vials of claim 13, wherein each of the plurality of liquid pharmaceutical vials comprise:

an internal storage region configured for storage of a liquid pharmaceutical;

an aperture positioned and configured for access to the internal liquid storage region by an injection needle; and a liquid seal affixed to the aperture, the seal including a region configured for piercing by the injection needle.

16. The affixed group of liquid pharmaceutical vials of claim 13, wherein the plurality of liquid pharmaceutical vials comprise:

a translucent seal affixed to each of theliquid pharmaceutical vials, the translucent liquid seal including a region configured for piercing by the injection needle.

17. The affixed group of liquid pharmaceutical vials of claim 13, wherein the largest surface of the substantially planar structure corresponding to the at least one planar surface configured to reversibly mate with the second planar surface of each of the plurality of liquid pharmaceutical vials.

18. The affixed group of liquid pharmaceutical vials of claim 13, wherein the support comprises:

a substantially planar surface configured to reversibly mate with the second surface of each of the plurality of liquid pharmaceutical vials.

19. The affixed group of liquid pharmaceutical vials of claim 13, wherein the first set of breakable connectors comprises:

a substantially linear projection from the first surface of the liquid pharmaceutical vial, the projection including a first end affixed to the first planar surface of the liquid pharmaceutical vial and a second end affixed to the first planar surface of an adjacent liquid pharmaceutical vial within the group of liquid pharmaceutical vials; and a breakable connection region between the first end and the second end, wherein the breakable connection is of a size, shape and position to be broken by hand by a user.

20. The affixed group of liquid pharmaceutical vials of claim 13, wherein the second set of breakable connectors comprises:

a substantially linear projection from the second planar surface of the liquid pharmaceutical vial, the projection including a first end affixed to the second planar surface of the liquid pharmaceutical vial and a second end affixed to the planar surface of the support; and a breakable connection region between the first end and the second end, wherein the breakable connection is of a size, shape and position to be broken by hand by a user.

21. The affixed group of liquid pharmaceutical vials of claim 13, further comprising:

a second plurality of liquid pharmaceutical vials forming an additional linear array of liquid pharmaceutical vials with minimal total volume of the additional linear array, each liquid pharmaceutical vial including a first exterior side with a planar surface configured to reversibly mate with a planar surface of an external side of an adjacent liquid pharmaceutical vial, each pharmaceutical vial including a second exterior side with a planar surface configured to reversibly mate with a planar surface of the support, the second plurality of liquid pharmaceutical vials positioned in parallel to the affixed group of liquid pharmaceutical vials, with the support positioned between the affixed group of liquid pharmaceutical vials and the additional affixed group of liquid pharmaceutical vials;

a third set of breakable connectors positioned between the plurality of liquid pharmaceutical vials arranged in the additional linear array of lliquid pharmaceutical vials with a minimal total volume, wherein at least one breakable connector is affixed the first planar surface of each liquid pharmaceutical vial, the at least one frangible connector positioned between each of the liquid pharmaceutical vials and the adjacent liquid pharmaceutical vial and affixing each first planar surface of a lquid pharmaceutical vial to a first surface of an adjacent liquid pharmaceutical vial with a minimal gap between each of the plurality of vials; and a fourth set of breakable connectors positioned between the plurality of liquid pharmaceutical vials arranged in the additional linear array of liquid pharmaceutical vials and the support, the fourth set of breakable connectors affixing the second sides of the plurality of liquid pharmaceutical vials in the additional affixed group of pharmaceutical vials to the support with a minimal gap between each of the plurality of vials and the support.

* * * * *